US008540562B2

(12) United States Patent
Roper et al.

(10) Patent No.: US 8,540,562 B2
(45) Date of Patent: Sep. 24, 2013

(54) ADVANTAGE BINGO BONUS

(75) Inventors: Jay Roper, Las Vegas, NV (US); Cara Iddings, Henderson, NV (US); Craig A. Paulsen, Reno, NV (US)

(73) Assignee: IGT, Las Vegas, NV (US)

( * ) Notice: Subject to any disclaimer, the term of this patent is extended or adjusted under 35 U.S.C. 154(b) by 1707 days.

(21) Appl. No.: 11/655,453

(22) Filed: Jan. 19, 2007

(65) Prior Publication Data

US 2007/0117608 A1 May 24, 2007

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .................. 463/19; 463/25; 463/29; 463/30; 705/67

(58) Field of Classification Search
USPC ........................... 463/19, 25, 29, 30; 705/67
See application file for complete search history.

(56) References Cited

U.S. PATENT DOCUMENTS

| | | | |
|---|---|---|---|
| 4,880,237 | A | 11/1989 | Kishishita |
| 4,953,895 | A | 9/1990 | Goussios |
| 4,962,950 | A | 10/1990 | Champion |
| 5,025,139 | A | 6/1991 | Halliburton, Jr. |
| 5,038,022 | A | 8/1991 | Lucero |
| 5,119,295 | A | 6/1992 | Kapur |
| 5,129,652 | A | 7/1992 | Wilkinson |
| 5,265,874 | A | 11/1993 | Dickinson et al. |
| 5,290,033 | A | 3/1994 | Bittner et al. |
| 5,292,127 | A | 3/1994 | Kelly et al. |
| 5,393,057 | A * | 2/1995 | Marnell, II .................... 463/13 |
| 5,429,361 | A | 7/1995 | Raven et al. |
| 5,557,086 | A | 9/1996 | Schulze et al. |
| 5,618,045 | A | 4/1997 | Kagan et al. |
| 5,643,086 | A | 7/1997 | Alcorn et al. |
| 5,678,886 | A | 10/1997 | Infanti |
| 5,707,285 | A | 1/1998 | Place et al. |
| 5,741,183 | A | 4/1998 | Acres et al. |
| 5,761,647 | A | 6/1998 | Boushy |

(Continued)

FOREIGN PATENT DOCUMENTS

| | | | |
|---|---|---|---|
| DE | 3441518 | A1 | 5/1986 |
| DE | 19502613 | A1 | 1/1995 |

(Continued)

OTHER PUBLICATIONS

Australian Examination Report dated May 20, 2008 for AU Application No. 2003201009, 1 page.

(Continued)

*Primary Examiner* — Omkar Deodhar
*Assistant Examiner* — Adetokunbo O Torimiro
(74) *Attorney, Agent, or Firm* — Neal, Gerber & Eisenberg

(57) ABSTRACT

One or more instances of a bonus game (e.g., Class II games such as Bingo games) may be provided to players of another wagering game (e.g., a Class III game such as a slot game, a poker game, etc.). Some implementations of the invention allow players to exchange indicia of credit (e.g., money, game credits, or player loyalty points) for bonus opportunities. For example, players may be able to purchase one or more Bingo cards for Bingo bonus games. Some implementations award bonus opportunities to players based on wager levels, game results, a player's level in a player loyalty program and/or other criteria.

23 Claims, 17 Drawing Sheets

(56) References Cited

U.S. PATENT DOCUMENTS

| | | | | |
|---|---|---|---|---|
| 5,768,382 | A | 6/1998 | Schneier et al. | |
| 5,770,533 | A | 6/1998 | Franchi | |
| 5,779,545 | A | 7/1998 | Berg et al. | |
| 5,785,315 | A | 7/1998 | Eiteneer et al. | |
| 5,795,228 | A | 8/1998 | Trumbull et al. | |
| 5,797,085 | A | 8/1998 | Beuk et al. | |
| 5,816,918 | A | 10/1998 | Kelly et al. | |
| 5,865,470 | A | 2/1999 | Thompson | |
| 5,871,398 | A | 2/1999 | Schneier et al. | |
| 5,876,284 | A | 3/1999 | Acres et al. | |
| 5,916,024 | A | 6/1999 | Von Kohorn | |
| 5,928,082 | A | 7/1999 | Clapper, Jr. | |
| 5,931,467 | A | 8/1999 | Kamille | |
| 5,971,195 | A | 10/1999 | Reidinger et al. | |
| 5,971,271 | A | 10/1999 | Wynn et al. | |
| 5,999,808 | A | 12/1999 | LaDue | |
| 6,007,426 | A | 12/1999 | Kelly et al. | |
| 6,012,832 | A | 1/2000 | Saunders et al. | |
| 6,012,983 | A | 1/2000 | Walker et al. | |
| 6,015,344 | A | 1/2000 | Kelly et al. | |
| 6,019,283 | A | 2/2000 | Lucero | |
| 6,048,269 | A | 4/2000 | Burns et al. | |
| 6,056,289 | A | 5/2000 | Clapper, Jr. | |
| 6,093,100 | A | 7/2000 | Singer et al. | |
| 6,104,815 | A | 8/2000 | Alcorn et al. | |
| 6,106,396 | A | 8/2000 | Alcorn et al. | |
| 6,113,098 | A | 9/2000 | Adams | |
| 6,135,884 | A | 10/2000 | Griswold et al. | |
| 6,139,430 | A | 10/2000 | Huard et al. | |
| 6,146,273 | A | 11/2000 | Olsen | |
| 6,149,522 | A | 11/2000 | Alcorn et al. | |
| 6,162,122 | A | 12/2000 | Acres et al. | |
| 6,217,448 | B1 | 4/2001 | Olsen | |
| 6,220,961 | B1 | 4/2001 | Keane et al. | |
| 6,231,445 | B1 | 5/2001 | Acres | |
| 6,234,477 | B1 | 5/2001 | Scrymgeour et al. | |
| 6,244,958 | B1 | 6/2001 | Acres | |
| 6,254,483 | B1 | 7/2001 | Acres | |
| 6,270,410 | B1 | 8/2001 | DeMar et al. | |
| 6,280,326 | B1 | 8/2001 | Saunders | |
| 6,285,868 | B1 | 9/2001 | LaDue | |
| 6,315,666 | B1 | 11/2001 | Mastera et al. | |
| 6,424,949 | B1 | 7/2002 | Deaton et al. | |
| 6,623,357 | B2 | 9/2003 | Chowdhury | |
| 6,636,892 | B1 | 10/2003 | Philyaw | |
| 6,758,757 | B2 | 7/2004 | Luciano et al. | |
| 6,832,956 | B1 | 12/2004 | Boyd et al. | |
| 6,852,031 | B1 * | 2/2005 | Rowe | 463/29 |
| 7,125,017 | B2 | 10/2006 | LaPorte et al. | |
| 2001/0036855 | A1 | 11/2001 | DeFrees-Parrott et al. | |
| 2002/0045472 | A1 * | 4/2002 | Adams | 463/19 |
| 2002/0065123 | A1 * | 5/2002 | Packes et al. | 463/16 |
| 2002/0077174 | A1 | 6/2002 | Luciano et al. | |
| 2002/0077175 | A1 | 6/2002 | Jorasch et al. | |
| 2002/0152179 | A1 * | 10/2002 | Racov | 705/67 |
| 2002/0177479 | A1 | 11/2002 | Walker et al. | |
| 2002/0183105 | A1 | 12/2002 | Cannon et al. | |
| 2003/0032474 | A1 | 2/2003 | Kaminkow | |
| 2003/0162591 | A1 | 8/2003 | Nguyen et al. | |
| 2003/0186739 | A1 | 10/2003 | Paulsen et al. | |
| 2004/0219967 | A1 | 11/2004 | Giobbi et al. | |
| 2006/0111168 | A1 * | 5/2006 | Nguyen et al. | 463/16 |
| 2006/0205482 | A1 | 9/2006 | Crivelli | |

FOREIGN PATENT DOCUMENTS

| | | | |
|---|---|---|---|
| DE | 4422370 | A1 | 1/1996 |
| EP | 0805424 | A2 | 11/1997 |
| WO | WO 95/24689 | | 9/1995 |
| WO | WO 96/00950 | | 1/1996 |
| WO | WO 01/76710 | A2 | 10/2001 |
| WO | WO 01/84516 | A2 | 11/2001 |
| WO | WO 2006/026203 | | 3/2006 |

OTHER PUBLICATIONS

U.S. Office Action mailed May 11, 2007 for U.S. Appl. No. 10/114,006.

U.S. Office Action (Advisory Action) mailed Aug. 23, 2007 for U.S. Appl. No. 10/114,006.

U.S. Office Action mailed Oct. 3, 2007 for U.S. Appl. No. 10/114,006.

U.S. Office Action mailed Apr. 10, 2008 for U.S. Appl. No. 10/114,006.

U.S. Office Action (Advisory Action) mailed Jul. 15, 2008 for U.S. Appl. No. 10/114,006.

U.S. Office Action mailed Oct. 2, 2008 for U.S. Appl. No. 10/114,006.

International Search Report mailed Jun. 10, 2008 for U.S. Appl. No. PCT/US2007/088678, including Notification of Transmittal, 7 pages.

Written Opinion of the International Searching Authority mailed Jun. 10, 2008 for Application No. PCT/US2007/088678, 8 pages.

"Heavy Duty Dollar Bill Size Direct Thermal Slot Machine Voucher: Operators Manual", Future Logic, Incorporated, 2000.

Rowe et al., "Wireless Gaming Environment", U.S. Appl. No. 09/544,884, filed Apr. 7, 2000, 34 Pages.

Richard E. Rowe, "Cashless Transaction Clearinghouse", U.S. Appl. No. 09/648,382, filed Aug. 25, 2000. 40 Pages.

Saffari et al., "Thermal Printer with Dual Head-Audit Trail", U.S. Appl. No. 09/795,337, filed Feb. 27, 2001, 38 Pages.

Hedrick et al., "Gaming Machine Having Secondary Display for Providing Video Content," U.S. Appl. No. 09/615,968, filed Jul. 14, 2000, 42 Pages.

Luciano et al., "Apparatus and Method for Dispensing Prizes", U.S. Publication No. US2001/0034259A1, Published Oct. 25, 2001, 25 Pages.

Brochure describing "Diamonds" bonus game-available prior to filing date in 2001.

"Where's the Smart Money," Science Technology, Feb. 7, 2002, Printed from website, www.economist.com, on Mar. 11, 2002, 2 Pages.

US Office Action mailed Aug. 25, 2004, from U.S. Appl. No. 10/114,006.

US Office Action mailed Dec. 27, 2004, from U.S. Appl. No. 10/114,006.

US Office Action mailed May 17, 2005, from U.S. Appl. No. 10/114,006.

US Office Action mailed Nov. 29, 2006, from U.S. Appl. No. 10/114,006.

* cited by examiner

*FIG. 5B*
RED STAR CASINO
INTERNET GAMING RECEIPT
PLAYABLE AT THE RED STAR CASINO IN
LAS VEGAS, NEVADA
511
519
RECEIPT AMOUNT: $254.87
519"
513
519'
PLAYER NAME:
MIKE SMITH
PLAYER
NUMBER: 75169
515
GAMING RECEIPT
SERIAL NUMBER:
5628460
517
523
525
521
Mike Smith
PLAYER SIGNATURE
PLAYER PHOTO
PLAYER FINGERPRINT
527
PROMOTIONAL BANNER ADVERTISEMENT AREA
GAMBLING.COM
GO
Click Here
Red or
Black?
The Ultimate
Gambling Directory
PLAY!
WIN PRIZES!
GAMBLING.COM
GO
S!
Please make your selection
from the following options:
FREE Casino Games
OK
Cancel

800

805 810 815

| RANK | CATEGORY | BONUS GAME LEVEL |
|---|---|---|
| 1-10 | Top | B |
| 11-50 | Moderate | C |
| 51-100 | Low | D |
| Everyone else | Monitor | None |

*Fig. 8*

| 905 **Player Status** | 910 **Buy-in Req'd?** D/C/B/A | 915 **Card D Award Frequency** (Normal/Max Bet) | 920 **Card C Award Frequency** (Normal/Max Bet) | 925 **Card B Award Frequency** (Normal/Max Bet) | 930 **Card A Award Frequency** (Normal/Max Bet) |
|---|---|---|---|---|---|
| Non-Member | N/Y/Y/- | 2%/4% | 1%/2% | .5%/1% | 0%/0% |
| Silver | N/N/Y/Y | 2%/4% | 1%/2% | .5%/1% | .3%/.8% |
| Gold | N/N/N/Y | 3%/8% | 2%/4% | 1%/2% | .5%/1% |
| Platinum | N/N/N/N | 4%/10% | 3%/7% | 2%/4% | 1%/2.5% |

900

*FIG. 9*

ADVANTAGE BINGO BONUS

CROSS-REFERENCE TO RELATED APPLICATIONS

This application is related to U.S. patent application Ser. No. 10/114,006, entitled "CASHLESS BONUSING FOR GAMING MACHINES" and filed on Mar. 29, 2002, which is hereby incorporated by reference for all purposes.

BACKGROUND

The present invention relates to awards issued by gaming machines such as slot machines and video poker machines. More particularly, this invention relates to bonus awards issued by gaming machines.

Casinos and other forms of gaming establishments are part of a growing multi-billion dollar industry, with electronic and microprocessor-based gaming machines becoming increasingly popular. In a typical electronic gaming machine, such as a slot machine, video poker machine, video keno machine or the like, game play is initiated through a player's wager of money or credit. The gaming machine determines a game outcome, presents the game outcome to the player and then potentially dispenses an award of some type, such as a monetary award, depending upon the game outcome.

Many additional gaming machine components, features and programs have been made possible in recent years through this proliferation of electronic gaming machines, including those involving linked progressive jackpots, player tracking and loyalty points programs, and various forms of cashless gaming, among other items. Many of these added components, features and programs can involve the implementation of various back-end and/or networked systems, including more hardware and software elements, as is generally known.

One way of generating extra interest and excitement for patrons of a casino is to provide bonuses to those who play wagering games. Such bonuses generally tend to be in addition to any customary payout for a regular outcome of the game. While existing systems and methods for providing bonuses have generally been adequate in the past, improvements are usually welcomed and encouraged. In light of the foregoing, it is desirable to develop systems and methods involving game bonuses that are more attractive to players and potential players.

SUMMARY OF THE DISCLOSURE

The present invention provides novel types of bonusing, including methods and devices for implementing such bonusing. According to some implementations of the invention, one or more instances of a bonus game (e.g., a session of Bingo games) may be provided to players of another wagering game (e.g., a Class III game such as a slot game, a poker game, etc.). Some implementations of the invention allow players to exchange indicia of credit (e.g., money, game credits, or player loyalty points) for bonus opportunities. For example, players may be able to purchase one or more Bingo cards for Bingo bonus games. Therefore, funding for bonus games may be derived, at least in part, from player "buy-in" for bonus games. Some implementations award bonus opportunities to players based on wager levels, game results, a player's level in a player loyalty program and/or other criteria.

Some implementations of the invention provide a gaming method that includes the following steps: providing a first type of wagering game; determining when a bonus criterion is satisfied; and providing an opportunity to participate in at least one instance of a second type of wagering game when the bonus criterion is satisfied.

The gaming method may also include the step of providing the second type of wagering game, which may be, e.g., a Bingo game. The first type of wagering game and the second type of wagering game may or may not be provided concurrently.

The step of providing the second type of wagering game may involve providing one instance among multiple instances of the second type of wagering game. The multiple instances may or may not be related according to a hierarchy. The hierarchy may correspond, e.g., with levels of a player loyalty program and/or with recent wagering activity. The multiple instances may involve higher prize amounts at higher levels of the hierarchy and lower prize amounts at lower levels of the hierarchy. Colored cards may be provided, wherein a card color may correspond with a hierarchy level.

The second type of wagering game may be provided during or after a session of the first type of wagering games. The second type of wagering game may comprise a Bingo game. The first type of wagering game may comprise a Class III game, e.g., a slot game, a poker game, a blackjack game, a keno game or a baccarat game.

Providing the first type of wagering game may comprise displaying the first type of wagering game in a first display device and providing the second type of wagering game may comprise displaying the second type of wagering game in a second display device. The first display device and the second display device may or may not be part of a single electronic gaming machine ("EGM"). The first display device may be part of an EGM and the second display device may be part of a second device, e.g., a personal digital assistant, a mobile gaming device, a cellular telephone, a laptop computer or a desktop computer. The EGM and the second device may or may not be located in a single gaming establishment. Alternatively, the first type of wagering game and the second type of wagering game are provided on a single display device.

The step of providing an opportunity may involve offering a Bingo card. The Bingo card may be, e.g., an electronic representation of a Bingo card or a hard copy of a Bingo card. The color of the Bingo card may correspond with a player ranking. The offering step may comprise offering the Bingo card in exchange for money, game credits and/or player loyalty points.

Alternative gaming methods are provided herein. One such method includes these steps: providing a Class III wagering game; establishing player rankings for players of the Class III wagering game; making a correspondence between player rankings and levels of bonus Bingo games; determining a set of players who will receive an offer to play the bonus Bingo games; and offering the set of players an opportunity to play the bonus Bingo games. The establishing step may involve referencing data pertaining to a player loyalty program and/or referencing recent player activity. The Class III wagering game may comprise a slot game, a poker game, a blackjack game, a keno game or a baccarat game.

The offering step may comprise offering Bingo cards for the bonus Bingo games in response to events pertaining to the Class III wagering game. The Bingo card may be, e.g., an electronic representation of a Bingo card or a hard copy of a Bingo card. The offering step may involve offering Bingo cards for the bonus Bingo games in exchange for money, player loyalty points or game credits. The offering step may comprise offering to a first rank of players, an opportunity to play a first level of bonus Bingo games and offering, to a second rank of players, an opportunity to play a second level of bonus Bingo games. The offering step may comprise offering, to a first rank of players, an opportunity to play a first level of bonus Bingo games at no extra charge; and offering, to a second rank of players, an opportunity to play a second level of bonus Bingo games in exchange for money, player loyalty points and/or game credits.

The methods of the present invention may be implemented, at least in part, by hardware and/or software. For example, some embodiments of the invention provide computer programs embodied in machine-readable media. The computer programs include instructions for controlling one or more devices to perform the methods described herein.

Accordingly, some implementations of the invention provide a gaming system, comprising: means for providing a first type of wagering game; means for determining when a bonus criterion is satisfied; and means for providing an opportunity to participate in at least one instance of a second type of wagering game when the bonus criterion is satisfied.

The gaming system may also include means for providing the second type of wagering game. The means for providing the second type of wagering game may include means for providing one instance among multiple instances of the second type of wagering game. The multiple instances may or may not be related according to a hierarchy. The gaming system may include means for providing colored cards, e.g., a kiosk, an EGM and/or a server. In some implementations, a card color corresponds with a hierarchy level.

The providing means may provide the second type of wagering game during or after a session of the first type of wagering games. Alternatively, the providing means may provide the first type of wagering game and the second type of wagering game concurrently. The second type of wagering game may be a Class II game, such as a Bingo game, a pulltab game or a lottery game. The first type of wagering game may be a Class III game, such as a slot game, a poker game, a blackjack game, a keno game or a baccarat game.

The means for providing a first type of wagering game may comprise means for displaying the first type of wagering game in a first display device. The means for providing the second type of wagering game may comprise means for displaying the second type of wagering game in a second display device. The first display device and the second display device may or may not be part of a single EGM. For example, the first display device may be part of an EGM and the second display device may be part of a second device, e.g., a personal digital assistant, a mobile gaming device, a cellular telephone, a laptop computer or a desktop computer. The EGM and the second device may or may not be located in the same gaming establishment. Alternatively, a single display device may be used as part of the means for providing the first type of wagering game and the means for providing the second type of wagering game.

The means for providing an opportunity may comprise means for offering a Bingo card, which may comprise, e.g., an EGM, a kiosk and/or a server. The Bingo card may be, e.g., an electronic representation of a Bingo card or a hard copy of a Bingo card. The color of the Bingo card may correspond with a player ranking and/or recent gaming activity. The offering means may be configured to offer the Bingo card in exchange for money, game credits or player loyalty points.

Alternative gaming systems are provided herein. One such gaming system comprises the following elements: means for providing a Class III wagering game; means for establishing player rankings for players of the Class III wagering game; means for making a correspondence between player rankings and levels of bonus Bingo games; means for determining a set of players who will receive an offer to play the bonus Bingo games; and means for offering the set of players an opportunity to play the bonus Bingo games. The Class III wagering game may comprise, e.g., a slot game, a poker game, a blackjack game, a keno game or a baccarat game.

The establishing means may comprise a host device, a server or other means for referencing data pertaining to a player loyalty program. The establishing means may comprise means for referencing recent player activity.

The offering means may comprise an EGM, a kiosk, a server or other means for offering Bingo cards for the bonus Bingo games in response to events pertaining to the Class III wagering game. The Bingo cards may be, e.g., electronic representations of Bingo cards or a hard copies of Bingo cards.

The offering means may comprise means for offering Bingo cards for the bonus Bingo games in exchange for money, player loyalty points and/or game credits. The offering means may comprise means for offering, to a first rank of players, an opportunity to play a first level of bonus Bingo games and means for offering, to a second rank of players, an opportunity to play a second level of bonus Bingo games. The offering means may comprise means for offering, to a first rank of players, an opportunity to play a first level of bonus Bingo games at no extra charge and means for offering, to a second rank of players, an opportunity to play a second level of bonus Bingo games in exchange for money, player loyalty points and/or game credits.

Alternative implementations of the invention provide a gaming machine for playing a primary game and a bonus game. The gaming machine includes these elements: a dispenser for issuing cashless indicia of game awards; primary game logic for determining an outcome of the primary game and for presenting a presentation of the primary game; and bonus game logic for instructing the dispenser to issue cashless indicia of bonus awards in response to a determination that a bonus event has occurred in response to an event in the primary game.

These and other features and advantages of the present invention will be described below with reference to the associated drawings.

BRIEF DESCRIPTION OF THE DRAWINGS

FIG. 8 is a table that represents a data structure for correlating player rank with levels of bonus games.

FIG. 9 is a table that represents a data structure for correlating player status with bonusing.

DETAILED DESCRIPTION

Introduction

Figure 1:
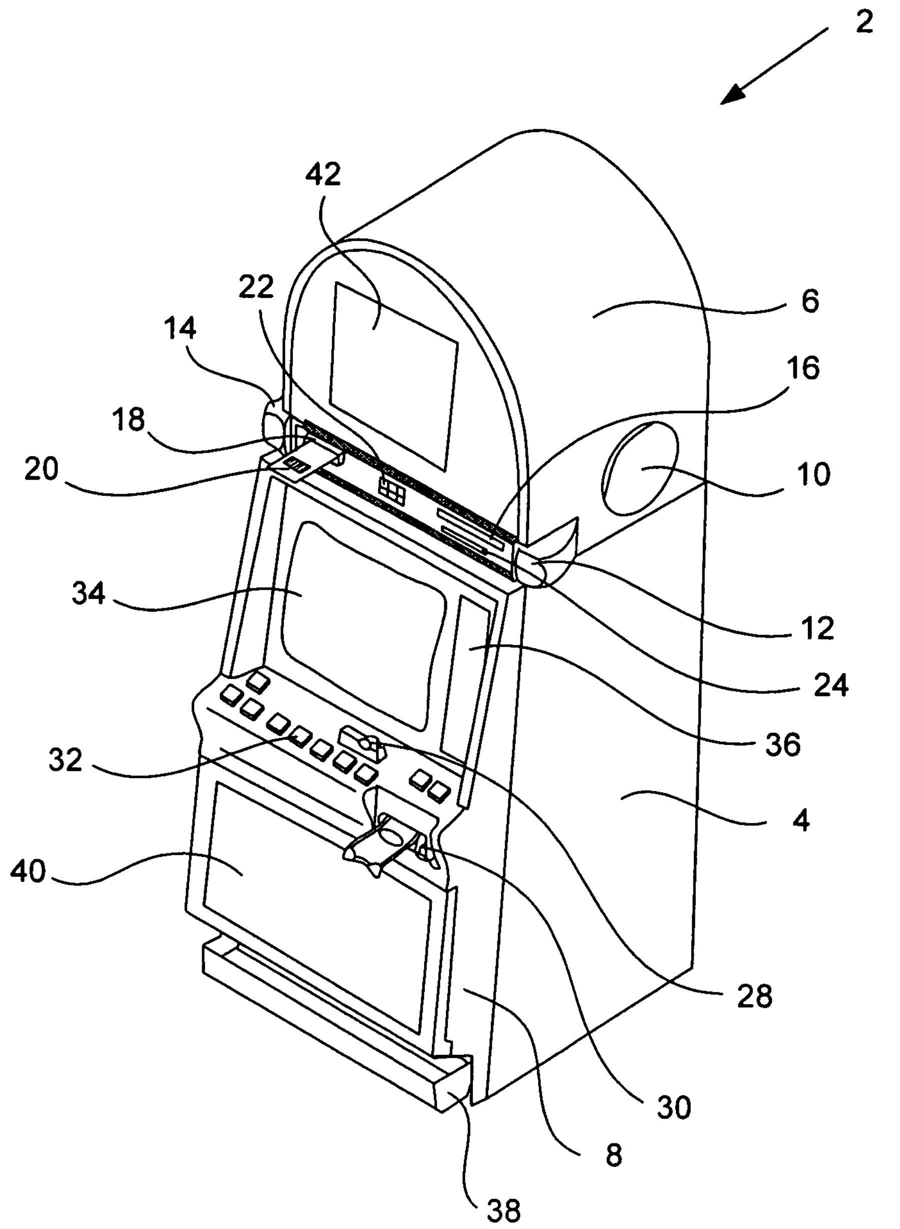
FIG. 1 is a perspective drawing of a gaming machine having a top box and other devices.

This invention pertains to technology for issuing bonus awards for or during play of a gaming machine. The bonus awards are issued via cashless instruments (sometimes referred to as "cashless indicators" or "cashless indicia" herein). These may be redeemed for various bonus awards such as services, merchandise, comps, additional game plays, etc.

The bonus award is issued as part of a "bonus game." The concept of the bonus game is rather expansive. It sometimes involves an elaborate secondary game presented on a gaming machine. Other times it involves a simple random or semi-random issuance of bonus awards not directly connected to a primary game on the machine. In most instances, it supplements a "primary game" played on a gaming machine. The primary game is typically a slot game, video poker, keno, checkers, pachinko, or other game provided on the gaming machine.

The primary game has its own awards for winning outcomes. The bonus awards of this invention (e.g., as provided via the cashless instruments, Bingo cards, etc.) supplement the "primary awards" issued for normal play of the primary game. Appropriate game logic determines when a bonus award should be issued. Typically, this is triggered when a predetermined or random event (a "bonus event") occurs. At that point, the game logic instructs the machine to issue an indication (e.g., a cashless indicator) of the bonus award. The bonus event may be tied directly to some event in the primary game (e.g., a coin in or coin out event). It may also be tied to the quantity of play on the primary game. For example, after a certain length of playing time or a certain number of primary game awards, the probability of the bonus award increases—or the award becomes certain.

The primary game is typically "executed" on the gaming machine during normal play. The execution may be triggered mechanically (e.g., the pulling of a lever actuates mechanically driven slot reels), electrically, or by a combination of the two. Typically, game execution is divided into at least two stages or components: game outcome determination (lose, win $A, win $B, . . . ) and game presentation. In modern gaming machines, game outcome determination typically employs an algorithm acting on or with a random number generator and a paytable. It occurs transparently. In other words, the player does not see it happening. Presentation involves displaying a video sequence or a mechanical sequence or both. At the end of the game presentation, the game outcome is depicted to the player. During a slot game play sequence, for example, game logic first determines whether the player will lose or win and, if she wins, how much she wins. This is the game outcome determination. Next, the gaming machine displays spinning reels (or electronic representations of spinning reels) during the game presentation phase. Finally, the game logic directs the reels to settle at positions corresponding to the game outcome originally calculated. If a winning event resulted, the machine will issue a primary award as either cash or a cashless indicator of the primary award.

The issuance of a cashless instrument representing the bonus award may occur at any time during play of the primary game. In one embodiment described herein, the cashless instrument issues concurrently with the primary award, sometimes as part of the same ticket or other cashless indicator. In certain other embodiments, the cashless instrument is issued entirely separate from the primary award. The separation may be in time, place, and format. Hence the primary award might be a cash award dropped from a coin hopper, while the bonus award might occur via a cashless ticket issued from a separate dispenser on the machine (or even on a separate machine) before or during game presentation. Other permutations are possible.

Note that the concept of a gaming machine extends to home computers connected over a network (often the Internet) to game servers that provide the necessary game logic to control interaction with a remote game player. The remote game player uses his/her client computer to receive network data from the game server. The game server determines the game outcome and directs the game presentation displayed on the client computer. As part of the network game, a cashless indicia of bonus awards are generated at the client computer. These may be printed from a local computer onto 8½×11 inch paper or another printable medium.

As explained in more detail below, the cashless indicia of the bonus award may take many different forms. General examples include tokens, printed tickets, cards (e.g., Bingo cards), electronic representations of cards, or coupons dispensed by machines, information written to a smart card, player tracking card, or other instrument controlled by the player (at least temporarily), and/or information written to a database or other repository of data pertaining to player.

In the case of redeemable instruments issued by gaming machines (or other apparatus associated with the game machine), the instrument may serve functions in addition to merely providing indicia of the bonus award. It may also include indicia of the primary game award, advertising, or other information. Both the indicia of the primary award and the indicia of the bonus award may be preprinted on blank instruments in the machine or one or both may be printed at issuance. In one embodiment, the indicia of the bonus award is preprinted on a portion of only certain instruments held in the machine prior to issuance. When a winning event occurs during the primary game, a new cashless instrument is printed to show the primary game award. If the instrument printed has, by chance, a bonus award preprinted thereon, the player wins both a primary game award and a bonus award, as indicated on the dispensed instrument. In one specific case, the bonus game award is indicated on one side of the instrument and the primary game award (or other information) is printed on the other side.

In another embodiment, the printed instruments are issued as duplicates, one showing a bonus award and the other showing other information such as a primary game award. Alternatively, a single instrument is issued, but that instrument has two portions that can be separated. One portion may be affixed to the other by perforations, adhesion, etc. In a specific embodiment, the two portions can be peeled apart from one another.

In still other embodiments, the bonus award instrument can be used to play a "secondary bonus game" such as a Bingo game, a scratch away lottery type game, etc. Or the cashless indicators of the bonus game may have different formats (e.g., colors) and multiple of these formats must be collected by a player in order to "win" the secondary bonus game. Examples of bonus games, including but not limited to Bingo bonus games, are set forth below.

Gaming Machines and Ticket Dispensing Apparatus

The machines described herein dispense or otherwise issue cashless indicia of a bonus award. They may accomplish this in a variety of ways. And, they may include many different combinations of award dispensers, play interfaces, bill validators, cashless indicia validators, etc.

The machine may have a single dispenser for awards from both the primary game and bonus game. Alternatively, the machine may include two or more award dispensers. In some embodiments, both of these dispensers can dispense cashless indicia. One of them is dedicated to issuing bonus awards and the other to issuing primary game awards. In other embodiments, one dispenser can be a cash dispenser and the other a cashless dispenser. The bonus awards are issued come from the cashless dispenser. The machine may also have a receptacle for accepting non-cash indicia such as the cashless instruments issued in accordance with this invention. Such receptacles allow the machine to credit players based on previously issued bonus awards or previously issued primary game awards.

The gaming machine may be a stand-alone machine or it may be connected to a server or other computational machine. It may also be connected to other gaming machines via a network. The network may allow communication by any of a number of suitable protocols, standard, proprietary, etc. If the machine is connected to a server, that server may (or may not) communicate information associated with the bonus awards. Such information includes directions to award bonuses, directions to return player information to update databases of bonus awards in the server, etc. One example of a cashless network system will be described below. In some embodiments, the gaming machine itself does not control the game outcome and/or the game presentation. The gaming machine, in such cases, is merely a terminal, a client computer, etc. And another machine contains the game logic for providing the outcome and/or presentation.

Generally, a master gaming controller (described below) and associated software or other logic instructions provide "primary game logic" and "bonus game logic." The primary game logic is responsible for determining a game outcome and instructing the gaming machine to give a game presentation consistent with that outcome. The bonus game logic is responsible for determining the bonus game outcome in response to one or more user inputs. In simple embodiments, this involves nothing more than a determination that a bonus award should be given randomly and then instructing the printer or other mechanism to issue the cashless indicia of the bonus award. In other embodiments, the bonus game logic instructs the gaming machine to give a sophisticated bonus game presentation. In some embodiments, the bonus game logic is coupled to the primary game logic in a manner allowing the bonus game logic to detect events in the primary game that trigger issuance of the cashless indicia of bonus awards.

A sample gaming machine suitable for use with this invention is depicted in FIG. 1. As shown, a video gaming machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the maximum coin value. The bill validator 30, player-input switches 32, video display monitor 34, and information panel are devices used to play a game on the game machine 2. The devices are controlled by circuitry (see FIG. 2) housed inside the main cabinet 4 of the machine 2. Many possible games, including traditional slot games, video slot games, video poker, video lottery, video blackjack, video pachinko, video keno, general video card games and video games of chance may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18, such as a thermal printer, which may print bar-coded tickets 20, a key pad 22 for entering player tracking information, a vacuum florescent display 16 for displaying player tracking information, a card reader 24 for entering a magnetic striped card containing player tracking information. Further, the top box 6 may house different or additional devices than those shown in FIG. 1. For example, the top box may contain a bonus wheel or a back-lit silk screened panel which may be used to add bonus features to the game being played on the gaming machine. During a game, these devices are controlled and powered, in part, by circuitry (see FIG. 2) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar counters and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present invention, as described below, can be deployed on most any gaming machine now available or hereafter developed.

Further, a game may be generated in a host computer and displayed on a remote terminal or a remote gaming device. The remote gaming device may be connected to the host computer via a network of some type such as a local area network, a wide area network, an intranet or the Internet. The remote gaming device may be a portable gaming device such as a cell phone, a personal digital assistant, and a wireless game player. Those of skill in the art will understand that the present invention, as described below, can be deployed on most any gaming machine now available or hereafter developed.

Returning to the example of FIG. 1, when a user wishes to play the gaming machine 2, he or she inserts cash through the coin acceptor 28 or bill validator 30. In addition, the player may use a cashless instrument of some type to register credits on the gaming machine 2. For example, the bill validator 30 may accept a printed ticket voucher, including ticket 20, as an indicator of credit. As another example, the card reader 24 may accept a debit card or a smart card containing cash or credit information that may be used to register credits on the gaming machine. In yet another example, an electronic fund transfer may be used to register credits on the gaming machine.

Typically, the information contained on the cashless instrument, including the ticket voucher, smart card or debit card, is validated by a cashless system. The cashless instrument, including the ticket voucher, smart card or debit card, may have been generated at the same property, for example a first casino where the gaming machine 2 is located or the ticket voucher may have been generated at another property for example a second casino. Details of the components of a cashless system and validation methods used in a preferred embodiment of a cashless system are described with reference to FIG. 3.

The dispenser of the cashless indicia of bonus awards can take many forms. To employ printed ticket vouchers in a cashless system, the physical ticket must satisfy a number of requirements. For example, like paper currency, the media of the ticket and the graphics on the ticket must be durable because a player may carry a printed ticket voucher for an extended period of time (e.g. months). While carrying the ticket, the player may repeatedly handle it in a manner that causes the ticket to degrade such as folding it or bending it. As damage accumulates to the ticket, it may eventually become unusable. Hence, the need for durability. Another requirement of printed ticket vouchers used in cashless systems is fast printing of high quality graphics. A quick print time is desirable because the player does not want to wait a long time to receive a printed ticket voucher. The high quality graphics are necessary for using the printed tickets in a ticket reader such as a bill validator. Yet another requirement of printed ticket vouchers is a very reliable and simple to operate printing mechanism to minimize maintenance and operation costs.

A thermal printer is a widely used mechanism for printing ticket vouchers as part of a cashless system that meets the requirements described above. A thermal printer uses a heated plate to thermally activate ink imbedded in a durable paper-like media. The thermal printer can quickly print high quality graphics that may be read by a ticket reader such as a bill validator. In addition, thermal printers tend to be reliable and easy to maintain.

One suitable printer for printing bonus award tickets in accordance with this invention is described in U.S. patent application Ser. No. 09/795,337, filed Feb. 27, 2001, by Saffari et al. That patent application is incorporated herein by reference in its entirety and for all purposes. For remote players (e.g., Internet gaming players), the printer can be a suitable home printer such as an inkjet printer or a laser printer.

For cashless bonus awards that are applied to portable instruments such as smart cards, personal digital assistants, and cellular telephones, the gaming machine may transfer data by a wireless medium. In such cases, the gaming machine will include an appropriate wireless signal transceiver and associated logic. For example, the gaming machine may include a mechanism for sending a cellular message a player's cellular receiver (e.g., a telephone), or a mechanism for sending and receiving infrared signals, or a mechanism for sending and receiving radio frequency signals. In each case, an appropriate data transfer protocol will be employed. The protocol may be proprietary or non-proprietary (e.g., BlueTooth).

Figure 2:
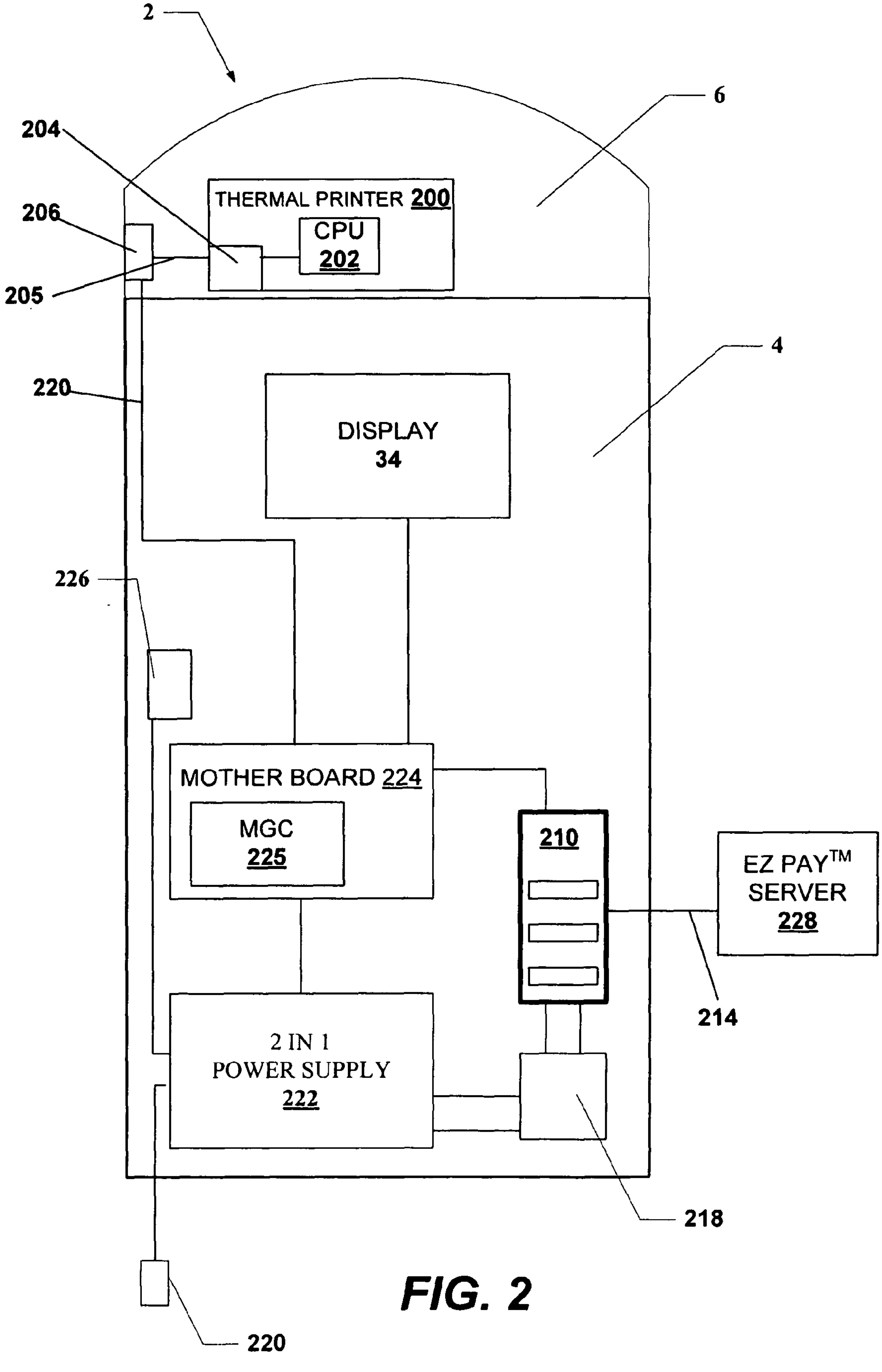
FIG. 2 is a block diagram of a gaming machine with a thermal printer.

FIG. 2 is a block diagram of the functional blocks that may be employed in the gaming machine 2 described above. The gaming machine includes a dispenser 200 of a design or configuration for generating cashless instruments in accordance with this invention. In one embodiment, dispenser 200 is as a ticket printer as described elsewhere herein.

The gaming machine 2 includes a top box 6 and a main cabinet 4 as described above. The gaming machine 2 may receive power from a source outside the gaming machine 2 such as an AC Power source 220. The AC power source 220 may be connected to a 2 in 1 power supply 222.

The 2 in 1 power supply supplies two power sources. An interruptible power source, which may be interrupted by a power switch 226 and a continuous power source that may not be interrupted by the power switch 226. The continuous power source may be used to power gaming devices such as a fiber optic card on a main communication board 210. The interruptible power source may be used to supply power to the dispenser 200 and other gaming devices residing within the gaming machine. When providing maintenance to the dispenser 200, it is usually necessary to interrupt the power using the power switch 226. Power to various gaming devices on the gaming machine may be routed through a power distribution board 218.

A mother board 224 includes components such as a master gaming controller 225 that allow a game to be presented on the gaming machine 2. The game presentation may be presented on a display 34. In addition, the master gaming controller 225 may communicate with dispenser 200 via the cable harness 220. The cable harness may also carry an interruptible power source to the dispenser 200.

Various pieces of information pertaining to the bonus game may be displayed on screen 34 of gaming machine 2. For example, the screen may describe of bonus options available with the primary game, it may display graphics and text intended to attract users to play, etc. This information may be displayed at various locations on screen 34. In one embodiment, a side region of the main display is dedicated to displaying bonus information. Such region may show the bonus information continuously or temporarily—e.g., intermittently.

In another embodiment, the bonus information may be displayed on a "secondary" display screen provided on the gaming machine (not shown in FIG. 2). That screen may be dedicated to the display of bonus information or it may display both bonus game information and primary game information. One example of a gaming machine having a suitable secondary display screen for use with some embodiments of this invention is disclosed in U.S. Pat. No. 6,135,884 issued on Oct. 24, 2000 to Griswold et al., and is incorporated herein by reference in its entirety.

Frequently, the dispenser 200 will be a printer such as a thermal printer. To enable printing, the master gaming controller 225 may send printing instructions to dispenser 200 and receive printing information from dispenser 200. The printing instructions may contain parameters to be printed on a blank cashless instrument. These parameters may be printed according to a printing template accessible to a CPU 202 on the dispenser 200. An example of a printed cashless ticket is described with reference to FIG. 5A. Besides parameter values, the printing instructions may also contain print commands such as "begin printing", "advance paper", etc.

As indicated elsewhere herein, a "virtual" ticket can be issued to a portable device (smart card, cellular telephone, etc.) if dispenser 200 is a data transfer mechanism such as a wireless transceiver. In most cases, the virtual ticket is fundamentally a computer file.

In accordance with this invention, dispenser 200 is used to generate cashless instruments such as ticket vouchers for bonus awards. These awards comprise prizes, promotions, hotel services, lottery games and other applications. Printing templates for these other applications may also be stored on the dispenser 200. In addition, dispenser may be employed to generate conventional cashless game instruments such as those issued by a cashless system such as the EZ Pay™ ticket voucher system, manufactured by IGT (Reno, Nev.).

In response to the printing instructions from the master gaming controller 225, the dispenser 200 may send its own printing information back to the master gaming controller 225. For instance, dispenser 200 may send information from sensors monitored by the CPU 202. The information may include printer status information such as "low on tickets", "paper jam" and "duplicate ticket storage bin full" or printing status information such as "initiating printing" and "printing complete."

The communication between dispenser 200 and the master gaming controller may be implemented using different communication standards and connection schemes. For instance, using a serial Netplex communication protocol, which is an IGT proprietary communication standard, parameter values may be sent to the dispenser 200 in 255 byte data packets. The Netplex communication protocol allows data to be sent at 19.2K baud rate. As other examples, a Universal Serial Bus (USB) communication protocol or an RS-232 communication protocol may be used for communication between dispenser 200 and the master gaming controller 225. USB and RS-232 each allow different data transmission rates.

The cabling and connection schemes allow data to be transmitted between dispenser 200 and the master gaming controller 225. When a Netplex communication protocol is used, a 10 pin connector 204 may be connected to an 8 pin connector 206 via a 7 line Netplex cable 205. When a USB communication protocol is used, standard USB connectors and cabling may be employed. When an RS-232 communication protocol is used, an RS-232 cabling and connection scheme may be utilized. Note that the gaming machine 2 may communicate, via a network interface 214 to an EZ Pay™ server 228 or other server.

Figure 3:
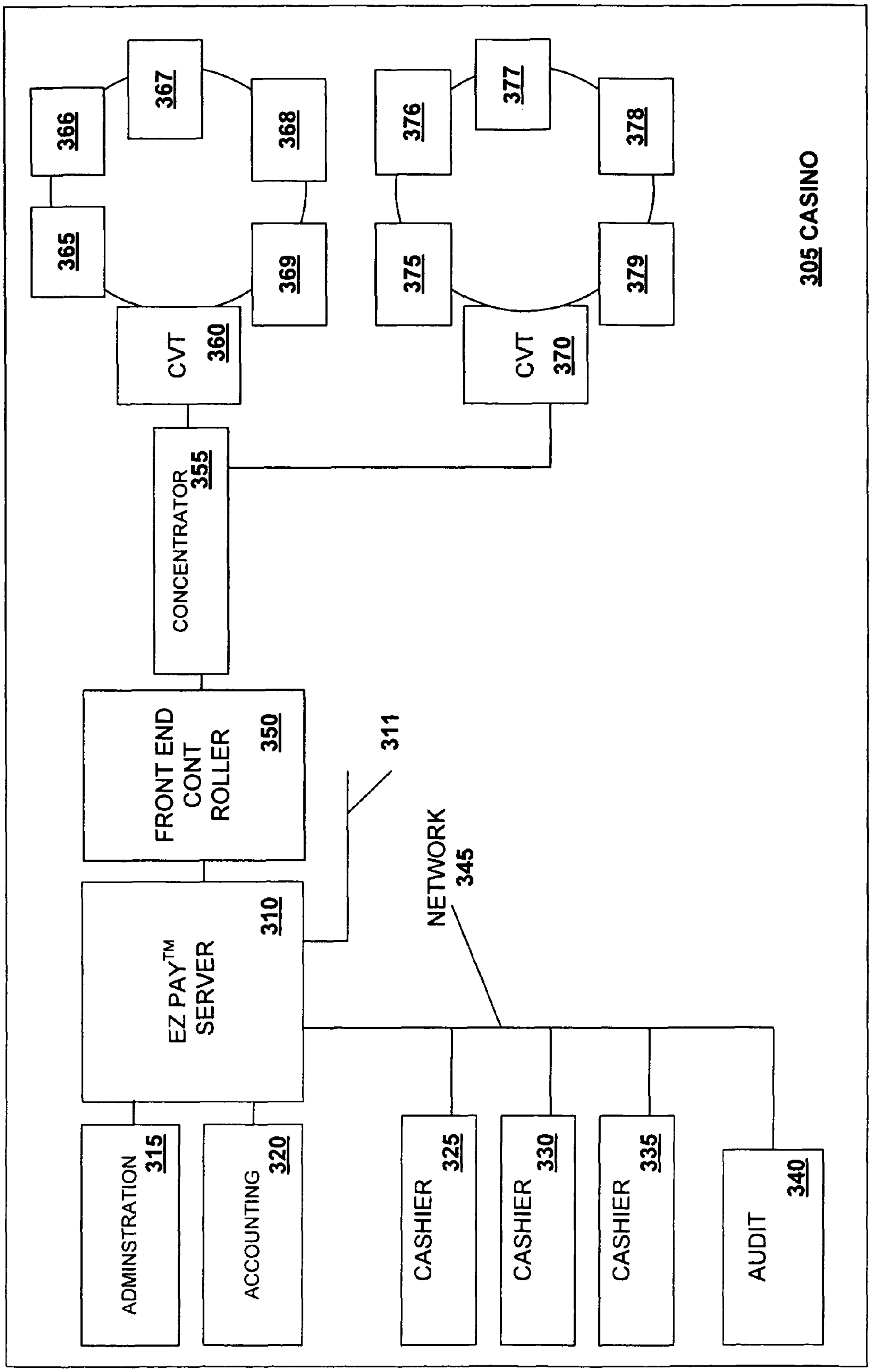
FIG. 3 is a block diagram of the components of a cashless system using the EZ Pay™ ticket voucher system including gaming machines with a thermal printer.

FIG. 3 is a block diagram of the components of a cashless system using the EZ Pay™ ticket voucher system in accordance with a specific embodiment of the present invention. A cashless system includes the hardware and software components needed to generate and validate cashless instruments. Components of a cashless system may include 1) data acquisition hardware, 2) data storage hardware, 3) cashless instrument generation and validation hardware (e.g. printers, card readers, ticket acceptors, validation terminals, etc.), 3) auditing software, 4) cashless instrument validation software and 5) database software. Many types of cashless systems are possible and are not limited to the components listed above or embodiments such as the EZ Pay™ ticket voucher system. Typically, a cashless system is installed at each property utilizing cashless instruments. To allow multi-site validations of cashless instruments, the cashless systems at each property may be linked to a cashless instrument transaction clearinghouse.

Returning to FIG. 3, a first group of gaming machines, 365, 366, 367, 368, and 369 is shown connected to a first clerk validation terminal (CVT) 360 and a second group of gaming machines, 375, 376, 377, 378 and 379 is shown connected to a second CVT 370. All of the gaming machines print cashless bonus award instruments, which may be exchanged for cash or accepted as indicia of credit in other gaming machines located within the property 305. As described above, a printer mounted in each gaming machine may be used to print a bonus cashless instrument. In this example, the ticket voucher serves as a cashless instrument. In addition, the gaming machines may accept ticket vouchers issued at a different property from property 305 where the different property utilizes the same or a different cashless system as compared to property 305.

The CVTs 360 and 370 store cashless instrument transaction information corresponding to the outstanding cashless instrument, including ticket vouchers, smart cards and debit cards, that are waiting for redemption. In this embodiment, the CVTs are separate from the gaming machine. However, the cashless instrument information may also be stored within each gaming machine or one gaming machine may functionally act as a CVT for a group of gaming machines eliminating the separate CVT hardware. In addition, cashless instrument transaction information may be stored in a cashless server including the EZ Pay™ server 310. The cashless instrument transaction information may be used when the ticket vouchers are validated and cashed out or redeemed in some other manner. The CVTs 360 and 370 may store the information for the ticket vouchers printed by the gaming machines connected to the CVT. For example, CVT 360 stores ticket voucher information for ticket vouchers printed by gaming machines 365, 366, 367, 368, and 369. When a ticket is printed out, ticket information is sent to the CVT using a communication protocol of some type from the gaming machine. For example, the gaming machine may send transaction information to the CVT, which is part of the cashless system using the slot acquisition system manufacture by IGT (Reno, Nev.).

In this embodiment, when a player wishes to cash out a bonus award indicated on a ticket, the player may redeem at the CVT associated with the gaming machine or any other CVT which is part of the cashless system associated with the CVT. For example, since CVT 360 and CVT 370 are connected as part of a single cashless system to the EZ Pay™ server 310, a player may redeem vouchers or utilize vouchers at the gaming machines, the CVTs (360 or 370), the cashier stations (325, 330, 335, and 340). The CVTs, cashiers, wireless cashiers and gaming machines may be referred to collectively as "cashless validation sites." To cash out the bonus award (or primary game award), the ticket voucher is validated by comparing information obtained from the ticket with information stored within the CVT. The information may be stored on the ticket as a bar code, radio-frequency identifier tag, etc. After an award has been redeemed, the CVT marks the ticket paid in a database to prevent a ticket voucher with similar information from being redeemed multiple times.

In this embodiment using the EZ Pay™ system, multiple groups of gaming machines connected to CVTs are connected together in a cross validation network 345. The cross validation network is typically comprised of one or more concentrators 355 which accept inputs from two or more CVTs and enables communications to and from the two or more CVTs using one communication line. The concentrator is connected to a front end controller 350 which may poll the CVTs for ticket voucher information. The front end controller is connected to an EZ Pay™ server 310 which may provide a variety of information services for the award ticket system including accounting 320 and administration 315.

The cross validation network allows ticket vouchers generated by any gaming machine connected to the cross validation network 345 to be accepted by any other gaming machine in the cross validation network 345. Additionally, the cross validation network allows a cashier at a cashier station 325, 330, and 335 to validate any ticket voucher generated from a gaming machine within the cross validation network 345. To cash out a ticket voucher, a player may present a ticket voucher at one of the cashier stations 325, 330, and 335 or to a game service representative carrying a wireless gaming device for validating ticket vouchers. Information obtained from the ticket voucher is used to validate the ticket by comparing information on the ticket with information stored on one of the CVTs connected to the cross validation network. In addition, when the ticket voucher was issued at another property, the information on the ticket may be stored at the other property. Thus, to validate the ticket voucher, the EZ Pay™ server may have to communicate with a cashless instrument transaction clearinghouse via the remote connection 311 to obtain the information necessary to validate the ticket voucher.

As tickets are validated, this information may be sent to audit services computer 340 providing audit services, the accounting computer 320 providing accounting services or the administration computer 315 providing administration services. In another embodiment, all of these services may be provided by the cashless server including the EZ Pay™ server 310. Examples of auditing services, which may be provided by cashless system software residing on the auditing computer 340 include 1) session reconciliation reports, 2) soft count reports, 3) soft count verification reports, 4) soft count exception reports, 5) machine ticket status reports and 6) security access report. Examples of accounting services, which may be provided by cashless system software residing on the accounting computer 320 include 1) ticket issuance reports, 2) ticket liability reports, expired ticket reports, 3) expired ticket paid reports and 4) ticket redemption reports. Examples of administration services, which may be provided by cashless system software residing on the administration computer 315 include 1) manual ticket receipt, 2) manual ticket report, 3) ticket validation report, 4) interim validation report, 5) validation window closer report, 6) voided ticket receipt and 7) voided ticket report. The duplicate ticket vouchers generated by the thermal printers in each gaming machine or duplicate receipts generated at the CVTs (360 and 370), cashier stations and wireless validation devices may be used to verify aspects of the auditing service reports, the accounting services reports and the administration services reports.

The Cashless Indicia of Bonus Awards

For the sake of convenience, the cashless instrument or indicator will sometimes be referred to as a "ticket," a data file, or the like. Bear in mind however that most embodiments of the invention are not limited to tickets or any other form of indicia—as opposed to some other indicator of a bonus award. For most embodiments and applications, any form of cashless indicia will do.

As noted above, the cashless indicia of the bonus award may take many different forms. One general class includes redeemable (often disposable) instruments such as tokens, printed tickets, coupons, and the like that are dispensed by machines. Another class includes information written to a portable instrument identifying a particular player (e.g., a smart card, player tracking card, personal digital assistant, cellular telephone, or other instrument controlled by the player at least temporarily). Here the cashless indicator is the card itself or at least the information written to the card. Rather than being immediately redeemable and disposable, the instrument is reusable. Often, the player carries the instrument with him/her in a wallet or other personal accessory. In this approach, the player presents his/her instrument to the gaming machine or associated device to have the bonus award information written. The player presents the instrument elsewhere to retrieve the bonus award. During this process, the instrument is updated to reflect that the player has received the bonus award. In yet another class, the cashless instrument comprises information written to a database or other repository of data pertaining to players. As long as the player can prove, by authentication or otherwise, she is who she represents herself to be, then she will be able to collect the bonus award indicated in the data repository. Of course, at the time the bonus award first accrues, the cashless indicator must be written in the data repository together with the player's identification. So during play at the gaming machine, the player should identify herself by a player tracking card, biometric information, PIN, etc. The same or different authentication information may be employed to retrieve the bonus award.

Figure 4:
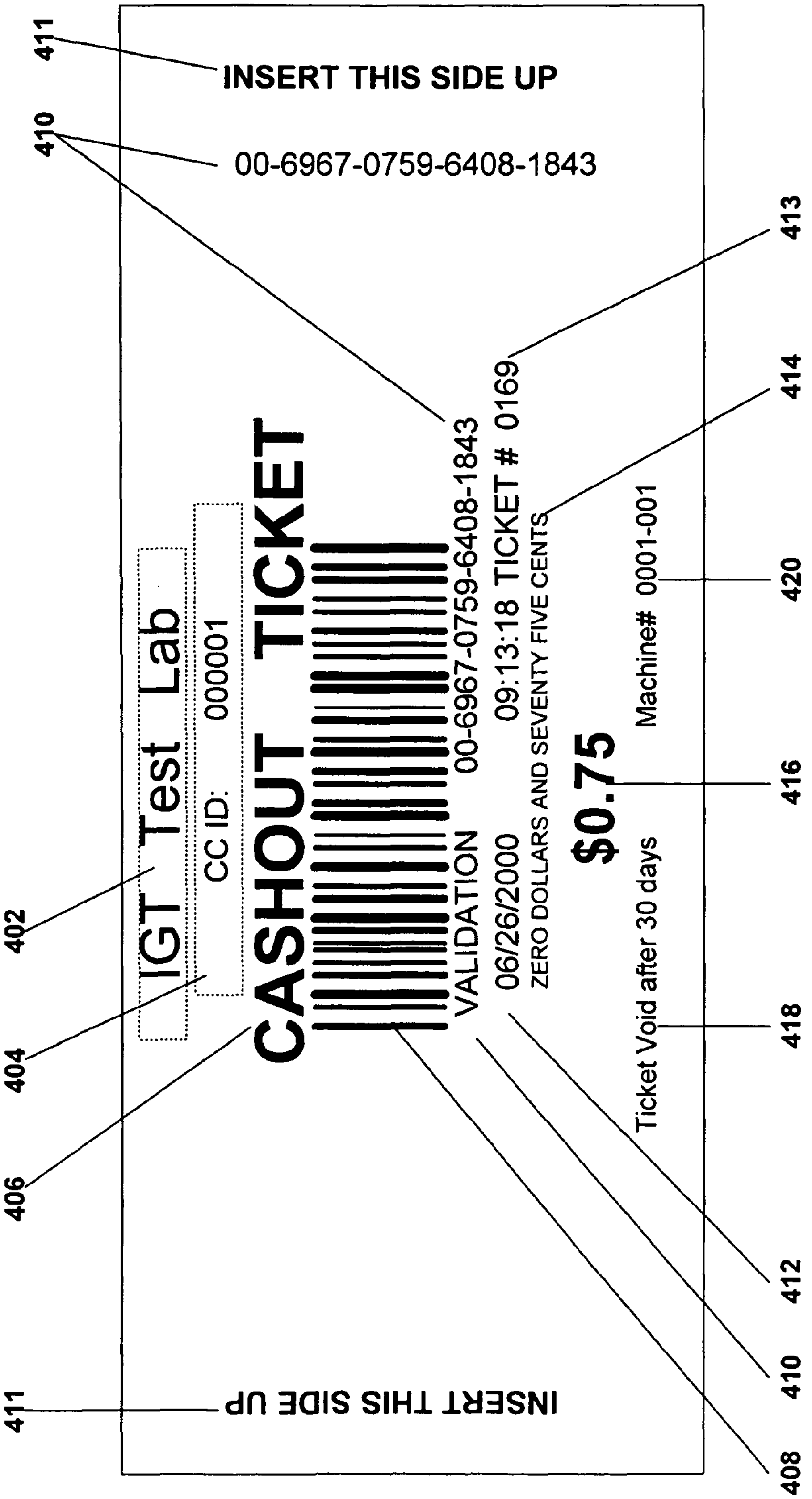
FIG. 4 is a block diagram of some components that may be provided on a printed ticket voucher.

When the cashless indicator of the bonus award is a ticket or other redeemable disposable instrument, it may take many different forms. One simple form is a paper or plastic ticket having various types of information printed thereon. FIG. 4 presents a specific example showing some components of a printed ticket 400. In one embodiment, the format of the ticket 400 may be generated from a template stored within a printer (e.g., a thermal printer as described above). The printing templates allow parameter values sent from the master gaming controller or other source of game logic on a gaming machine or from another gaming device such as a server to be printed in the format of a ticket voucher 400, a receipt or some other format.

Examples of parameter values that may be printed on a ticket include: 1) an establishment 402, a location 404 (e.g. city, state and zip code), 3) a ticket type 406 (e.g. cashout, receipt, duplicate, duplicate receipt, etc.), 4) a bar code 408, 5) a ticket validation number 410, 6) an issue date and issue time 412, 7) a ticket number 413, 8) a textual ticket value 414, 9) a numerical ticket value 416, 10) an expiration date 418 and 11) a machine number 420. In addition, preprinted graphics or text, including "INSERT THIS SIDE UP" 411, may be printed on each ticket. Note that validation identifiers other than validation number 410 and/or bar code 408 may be employed. As explained below, some tickets may employ an RFID or other transponder device.

Information such as the ticket value, the ticket issue date, the ticket issue time, the ticket number and the machine ID may be common to cashless systems that generate and validate tickets issued at a single property. In addition, information such as the ticket issue location may be needed to allow multi-site generation and validation of cashless instruments. Further, other types of information, besides the information listed above, may be stored on the cashless instrument.

In some embodiments, the ticket may serve a dual role. It presents both a bonus award and a primary award for a winning outcome on the primary game. In some such embodiments, only selected tickets may present both awards. Other tickets would merely present the primary award (or the bonus award without a primary award).

The tickets showing the bonus award may be generated in response to a specific bonus event identified in the game logic and/or a random event, not directly connected with a displayed bonus game. In the later case, one embodiment involves providing random (or selected) tickets in a fold of blank printable tickets with preprinted indicia of the bonus award. Then, when a ticket is printed with indicia of a primary award (from a winning event on the primary game), it may or may not also contain indicia of the bonus award depending on whether the current ticket was one of those that were preprinted. In certain embodiments, the bonus award indicia is preprinted on the backside of a ticket, while the primary award indicia is printed on the front-side at the time of issuance.

Alternatively, the bonus award indicia is not preprinted on any tickets, but rather printed fresh at the time when the tickets are issued.

In some embodiments, the cashless indicator of the bonus award is issued concurrently with indicator of the primary award, like the embodiments just described, but unlike these earlier embodiments, the bonus award is indicated on a separate ticket. That separate ticket may be issued from the same dispenser that issues the primary award ticket or from a separate dispenser. In one convenient embodiment, a ticket printer has a dual heads so that it can concurrently print the bonus award ticket and the primary award ticket. These may be printed on different ones of a duplicate ticket pair provided from a fold of blank tickets using a printer of the type described above, for example. A bonus ticket from a duplicate ticket pair may use a similar or different template as used for printing the primary ticket. Either or both of the bonus ticket and the primary ticket may have some preprinted information.

As an alternative to the duplicate ticket embodiment, the blank ticket may be a unitary instrument having at least two portions that are separable from another. At least one portion represents the bonus award. Another portion or portions may represent the primary game award. The portions may be separable by a perforation, adhesion, electrostatic attraction, breakable seal, etc.

In a particularly preferred embodiment, the cashless instrument includes two portions adhesively connected and separable from one another by peeling one away. The one portion that peels off can be used as the cashless indicator of the bonus award and the other portion can be the cashless indicator of the primary award. Alternatively, the other portion can contain advertising or other relevant information. Possibly, it can provide information pertaining to other products or services of the vendor or manufacturer of the bonus award.

Figure 5A:
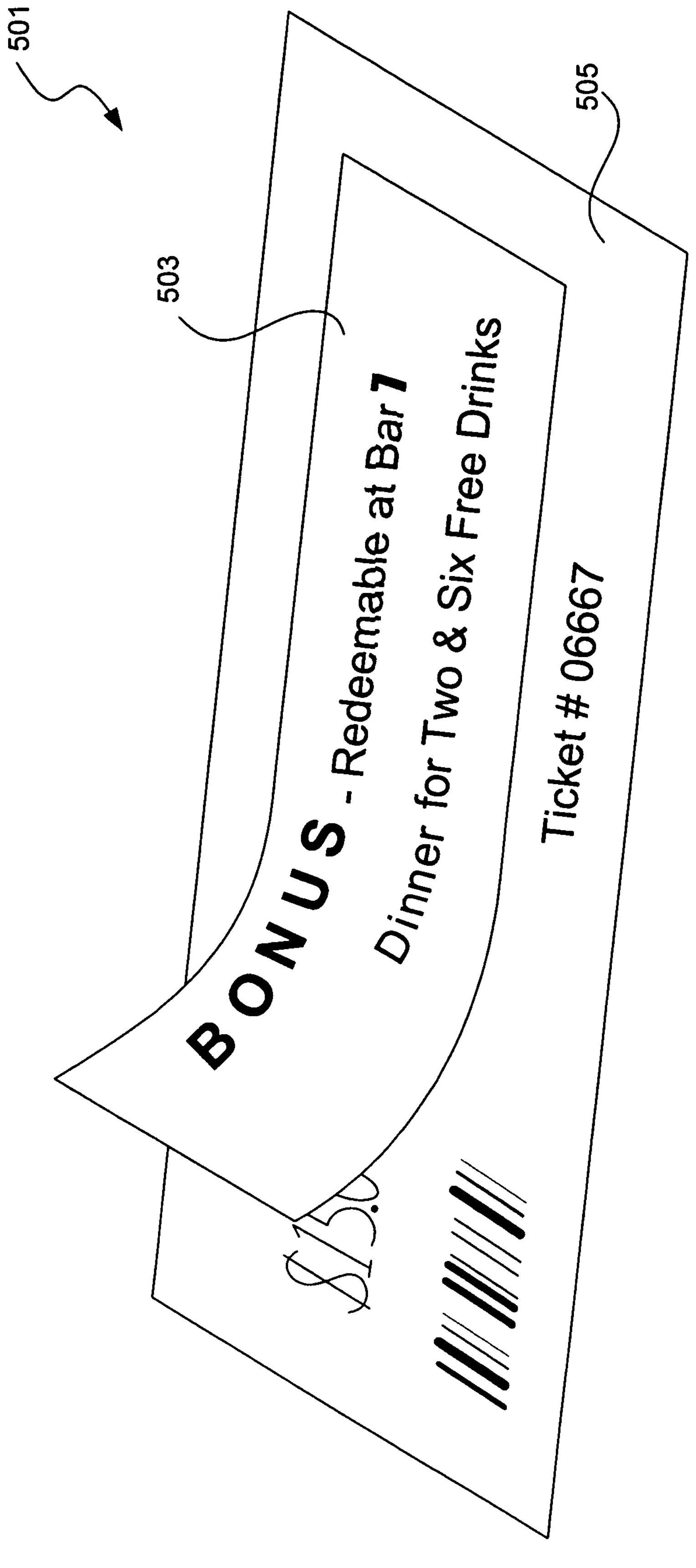
FIG. 5A shows a cashless instrument having two separable portions.

FIG. 5A depicts one embodiment of a two portion peelable ticket of this invention. As shown, a ticket 501 includes a first portion 503 which serves as the cashless indicator of the bonus award and a second portion 505 which serves another purpose such as advertising or indicating a primary game award.

In still other embodiments, the cashless indicator may provide one or more "secondary games." In addition to the bonus award represented in the cashless instrument, the instrument contains some other novelty that allows play of a secondary game. Alternatively, the secondary game could serve as the bonus award itself or a "hurdle" to the bonus award. Examples of secondary games include Bingo games, scratch games, collect all of a category games, raffles, sweepstakes, lotteries, trivia games, etc. In some such implementations, the cashless indicator itself may serve as a medium for the secondary game. In some cases, e.g., certain raffles, the ticket includes the player identity. In some embodiments, the machine prints the player identification directly on the ticket—deriving such information from a player tracking system or the like. Alternatively, in some implementations, the player must fill in her name and contact information. In other embodiments, a serial number or other unique feature of a ticket provides the necessary identification.

In one specific example, the secondary game comprises a lottery in which the cashless indicator serves as lottery ticket. The bonus game that issues such tickets may be tied into an existing lottery—even a government run lottery. Or it may be associated solely with the bonus game in question. Regardless of how the larger game is structured, the lottery component of the ticket is similar or identical to that provided with a state lottery, but it is issued as a bonus or prize. To implement the lottery, the backside of the ticket will include a scratch-off or peel-off lottery game. The tickets containing the lottery mechanism are issued randomly from the supply of machine tickets in one embodiment. They are issued as part of a planned event in another embodiment. In this second embodiment, the lottery component may be printed on the card in response to a specific event in the primary game (or otherwise).

Various mechanisms can be used to provide for authentication, anti-counterfeiting, and/or tracking. Bar codes, watermarks, and/or printed identifiers (numbers, signatures, pictures, fingerprints) provide one mechanism. In this regard, related information is provided in U.S. Pat. No. 6,905,411, titled "PLAYER AUTHENTICATION METHOD FOR GAMING MACHINE VOUCHERS", naming Nguyen and Paulsen as inventor, and filed Feb. 27, 2002, and in U.S. patent application Ser. No. 10/926,636, filed on Aug. 25, 2004 and entitled, "METHODS AND DEVICES FOR GAMING ACCOUNT MANAGEMENT," both of which are incorporated herein by reference for all purposes. One sophisticated and secure technology employs a transponder that can reply to an external probe with a signal identifying it. Because such transponders are embedded in the cashless indicator, they also identify the indicator itself. Transponders can respond to various types of probes including electromagnetic radiation, magnetic fields, electrical fields, chemical signals, and the like depending upon design.

One specific mechanism is a passive radio-frequency identification tag (RFID) embedded in the cashless indicator. A typical passive radio-frequency identification tag includes an antenna (e.g., a coil of wire) and logic (e.g., a simple microchip) for responding to an RF interrogation or "probe" signal with a reply signal containing a unique identifier associated with the tag. When in proximity of an interrogation signal, the RFID uses a small amount of the electromagnetic energy it receives to power the logic and broadcast its identifier. Thus, the passive RFID requires no battery or other active power source. At time of this filing, relatively small rids (e.g., less than one millimeter across and 0.5 millimeters thick) suitable for use with cashless instruments of this invention are available from Texas Instruments Corporation in the US, Hitachi in Japan, and Infineon Technologies in Germany. Smaller more robust versions are expected in the near future.

Figure 5B:
FIG. 5B shows a cashless instrument printed from a client computer that can participate in gaming remotely, over a network.

In certain Internet gaming (more generally network gaming) embodiments, the player is able to print her own gaming receipt (which may serve as a cashless indicator of a bonus award) on her home printer. In some implementations, the printout may be suitable for redemption at a physical (brick and mortar) casino. FIG. 5B depicts a sample gaming receipt for Internet gaming. In this example, the player Mike Smith is registered with the Red Star Casino in Las Vegas, Nev. After he returns home from visiting the Red Star Casino, he continues to play. He may do so with points/bonuses/cash accrued at the Red Star. He does this by playing on the Red Star Internet site.

At the conclusion of the Internet play, he prints out a receipt (likely on 8½×11 paper) on his home computer printer to take with him to Las Vegas to redeem. The receipt can be redeemed at a game machine, casino kiosk, or other area, or online In this example, the receipt information includes the following: cash amount 511 (this could also be points or credits), player name 513, player number 515 assigned when he enrolled with the casino, and a unique gaming receipt number 517. In this example, these items have associated bar codes 519, 519', and 519" that can be scanned by the casino or by the game machine when the ticket is redeemed.

Upon redemption at the casino, the player's identity must be verified. In one approach, the player signs the receipt or prints a pre-digitized version of his signature 521 on the cashless instrument. The signature is then compared to a stored signature in a system database. In this embodiment, the player's signature is stored when the he signs up for an Internet gaming program. In an alternative approach, the player's identity is verified using a picture 523 of the player that is stored in the casino's system. When the player attempts to redeem his Internet gaming receipt, the picture is verified by casino personnel. Alternatively, an algorithmic facial recognition system is employed to verify that the player is who he says he is. In yet another approach, the player gives his fingerprint when redeeming his Internet gaming receipt. That fingerprint is compared against one stored in the casino's system. The stored fingerprint may also be printed as printed code 525 (shown as a fingerprint in this example) on the receipt. Note that while FIG. 5B shows a digitized signature 521, a picture 523, and a code 525, the receipt typically contains only one of these. Of course, banner ads and promotions 527 may be printed on the bonus award receipts. This allows the casino and its partners advertising and promotional space on the ticket.

Figure 6:
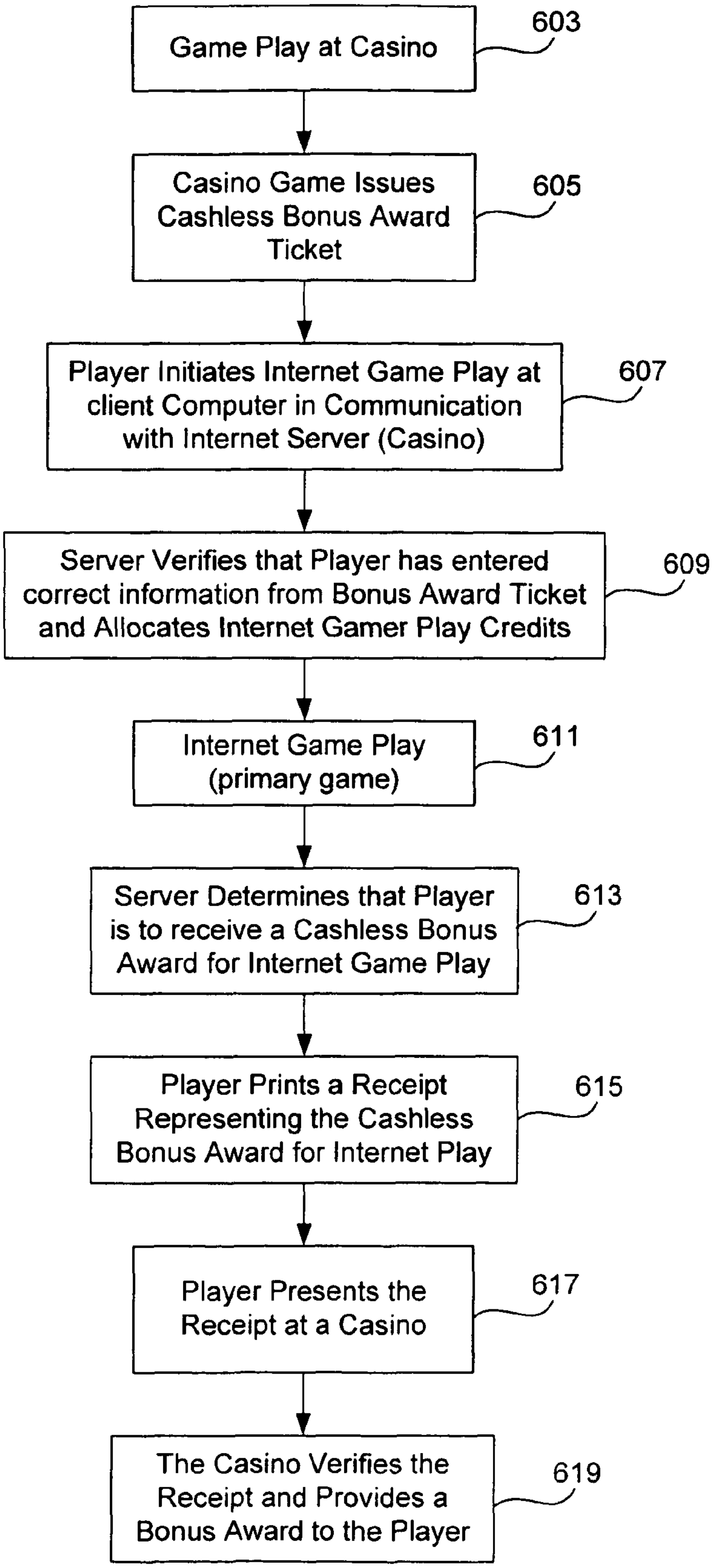
FIG. 6 is a process flow diagram depicting the sequence of operations in an Internet Gaming application.

FIG. 6 presents one likely scenario for using the cashless bonus awards of this invention for Internet gaming. The process begins at 603 with a player playing a particular game on a gaming machine in a casino. For example, the player may be playing a slot game on a slot machine or a video poker game on a video gaming machine. As explained above, such game represents a "primary game" in the context of this invention. At some point during the game play, or after the game play concludes, the casino game issues a cashless bonus award ticket to the player. See block 605.

In the depicted scenario, the player then leaves the casino and goes to another location outside the casino. For Internet gaming, that other location may well be the player's home. Regardless, while at this remote location, the player initiates an Internet game play through a client computer (possibly the player's home PC). See block 607. The client computer is in communication with a game server at the casino. The communication is mediated by the Internet. As part of the Internet game play, the player uses the cashless bonus award received while playing at the actual casino. In this embodiment, the Internet gaming protocol allows the player to make use of the bonus award from his or her client computer. To this end, the casino server must verify that the player has entered correct information from the bonus award ticket. See block 609. As indicated above, the server may verify by receiving a unique code identifying the bonus award ticket. Other means of verification are possible if the client computer has an associated card reader, barcode scanner, or other appropriate peripheral device. Regardless of how the casino verifies the bonus award, once verification is complete, the casino server allocates Internet game play credits to the Internet gaming player.

From this point, the player can participate in an Internet gaming session while drawing on the credits obtained from his or her cashless bonus award. See 611. Note that most, if all, of this Internet game play constitutes a primary game. In some embodiments, the use of a cashless bonus award extends no further. The player simply makes use of that cashless award to obtain credits for Internet game play. In other embodiments, however, the Internet gaming protocol itself can issue separate cashless bonus awards. This embodiment is depicted in the remainder of the process flow diagram of FIG. 6.

As indicated at block 613, the server determines that the player is to receive a cashless bonus award for his or her Internet game playing. To provide a cashless indicator of this bonus award, the player prints a receipt representing the award. See 615. As discussed above in the context of FIG. 5B, this receipt may include various fields useful for redeeming the bonus award. Note that the client computer can also print a cashless indicator of an award for play on the primary Internet game. And the cashless indicator may include indicia for both a primary award and a bonus award in a single printed receipt.

At block 617, the player presents the receipt at a casino associated with the Internet gaming server. The casino then verifies the receipt and provides a bonus award to the player as indicated at block 619. This award can take any of a number of forms as described in the next section.

Types of Awards

The intrinsic value in the cashless instrument resides in its ability to be converted to a bonus award—typically cash, prizes, and/or additional game plays. The player redeems the cashless instrument at a gaming machine or other location, typically in a casino. In the case of Internet-enabled gaming, the player may redeem the ticket at a client computer, where he or she enters information from the cashless instrument to allow game plays from the client computer.

An organization controls the generation and redemption of the cashless instruments. In one example, prize redemption is run by a casino or by a casino in partnership with another business. For example, casino X could partner with Cool Shoes athletic shoe manufacture to offer court shoes as one type of redemption prize. A cross-promotional bonus award may be issued depending upon the facilities available near the casino. For example, food or merchandise from vendors affiliated with the casino may be awarded.

Many different bonus awards are possible including generally services, merchandise, cash, comps, etc. More specific examples of prizes include vacations, airline miles, shopping sprees, automobiles, computers, airplane trips, camping trips, adventures, cruises, sporting equipment, jewelry, spas, etc. The awards can belong to different "tiers," with some awards being more valuable than others. For example, the awards may be diamonds, with higher tier awards being larger diamonds. The higher tier awards are obtained by redeeming multiple cashless instruments. In other embodiments, the individual cashless instruments have different intrinsic values (e.g., gold, silver and bronze). The higher value tickets are redeemed for higher tier prizes.

In addition, the cashless instrument may represent a credit for additional plays on the issuing machine or on some other machine. In one embodiment, the cashless instrument may be converted to game plays on any other machine in a property (e.g., casino, store, or mall) or a subset of machines in the property. In another embodiment, the cashless instrument allows play on any machine under control of a particular enterprise or group of allied enterprises. Thus, the cashless instrument can be redeemed as plays on numerous machines across multiple properties. In another embodiment, the cashless instrument allows gaming over the Internet or other large network. For example, a casino machine may issue a bonus award ticket having a serial number and redeemable dollar amount. The player takes that ticket home with her and continues playing at the casino's Internet gaming site. To do this she logs on to the casino's site, enters her user ID, password, and the ticket serial number, and then continues to play.

Note that when the cashless instrument is presented to another machine for play it need not initiate a "normal" general-purpose play. In some embodiments, the instrument may trigger more rapid progression into a bonus mode or more rapid accrual of bonus awards. Also, the instrument may trigger award of different types of complementary bonus awards. Many variations on this theme are possible. In one embodiment, if the cashless instrument was obtained at a Harley-Davidson™ game, then the bonus awards provided at another machine (upon insertion of the cashless instrument) are leather jackets or other motorcycle merchandise, for example.

Bonus Games

As used herein, the term "bonus game" and variations thereof refer generally to a game or a component of a game involving procedures in addition to the primary game on the gaming machine. For example, if the primary game is a reel slot game, the bonus game may allow players the possibility of winning more than the pay table indicates. Typically, but not necessarily, the bonus game outcome will depend upon the outcome of the primary game. For example, a bonus game outcome may be contingent upon a "cherry" symbol being displayed on a slot reel at the end of a slot game play. Also, the bonus game outcome may depend upon winning a payout from a slot game play while the gaming machine is in a "bonus zone." In alternative embodiments, the bonus game may be unconnected with the outcome of a primary game play.

A few very specific bonus games will now be described. Please understand that these are merely a very few of the many different bonus games that can be envisioned for use with this invention.

A first game of interest is referred to as a "times pay bonus" game. In this game, a player may enter a "window of bonus activity" after a predetermined number of coins have been played (e.g., 100-200 consecutive coins or credits). While in the window, a player may randomly encounter plays in which the payout is multiplied beyond the amount on the pay table or otherwise enhanced. In one embodiment, a system operator can specify both the size of the window (i.e., the number of consecutive plays in which a player remains in the window) and the number of coins needed to reach the window.

While in the window, the system will randomly assign special significance to a certain number of consecutive game plays referred to as a "bonus zone." If while the player is in a zone, he or she obtains a winning combination, then the pay-out associated with that combination is multiplied by a set factor (e.g., 2 to 9) or otherwise enhanced. The enhanced ("bonus") component may, for example, be paid out via a cashless instrument as described above.

In one specific embodiment, the operator of the machine can specify such parameters as the size of the zone and the multiplier for any times paid bonus winning combination. As mentioned, the operator may also be able to set the number of coins/credits required to reach a window and the size of the window. Upon the selection of a new setting, the system will automatically adjust the overall payout percentage including bonus contribution.

In an alternative embodiment, the number of times play games awarded (e.g., the size of the zone) and the times play multiplier amount may be adjustable depending upon such factors as the time of day, a level of player status, a type of player tracking card inserted, or other specified events. When such adjustments occur, the display can make this clear to the player.

A variation on the "times play bonus" game is a "mystery jackpot bonus" game. A "window" is reached after a predetermined number of coin in events as described above for times play bonus game. Before reaching the window, the system may periodically display a bonus indicator on the display requesting that the player "WATCH FOR THE MYSTERY JACKPOT BONUS." This display may be accompanied by some unique sound such as a "ding" sound. While in the window, another more frequently displayed attract screen accompanied by two dings tells the player that the bonus is "COMING SOON."

When the mystery jackpot randomly hits within the window, a graphic appears on the screen to indicate that a game play results in the mystery jackpot. The graphic may be, for example, a mystery jackpot logo with multiple question marks pulsating in the background. Upon receipt of a winning play, the system converts the question marks to the amount won and a congratulations statement. An accompanying sound may play when the mystery jackpot is hit.

The game operator may set such parameters as the number of coins needed to reach the window, the size of the window, number of coins in a play session, number of coins out in a play session, and the jackpot range. These parameters may also be adjusted via a system automatically depending upon the time of day, a player's tracking card priority, etc. When any parameter is reset, the system automatically recalculates the game percentages.

The next bonus game of interest is a "temperature's rising bonus" game. This game is centered about an image of a thermometer presented in the display. Initially, the thermometer indicates a relatively low temperature. With each payout from a machine, the temperature in the thermometer rises by a notch. Eventually, when the temperature reaches a maximum value, the next win is accompanied by a bonus that may, e.g., be evidenced by issuance of an appropriate cashless instrument. After payout, the system will normally reset to the lowest possible temperature.

Examples of other types of suitable bonus game include the following. In a lottery/sweepstake game, the player receives an entry every time a bonus trigger condition is activated. In a free plays bonus game, the player receives one or more free games whenever the bonus event occurs. In another example, the player receives one of X different symbols upon triggering of a bonus condition. The player collects all X symbols to win the bonus award. And, of course, there is the instant award in which the player instantly wins a non-cash bonus award upon occurrence of the bonus event.

Figure 7A:
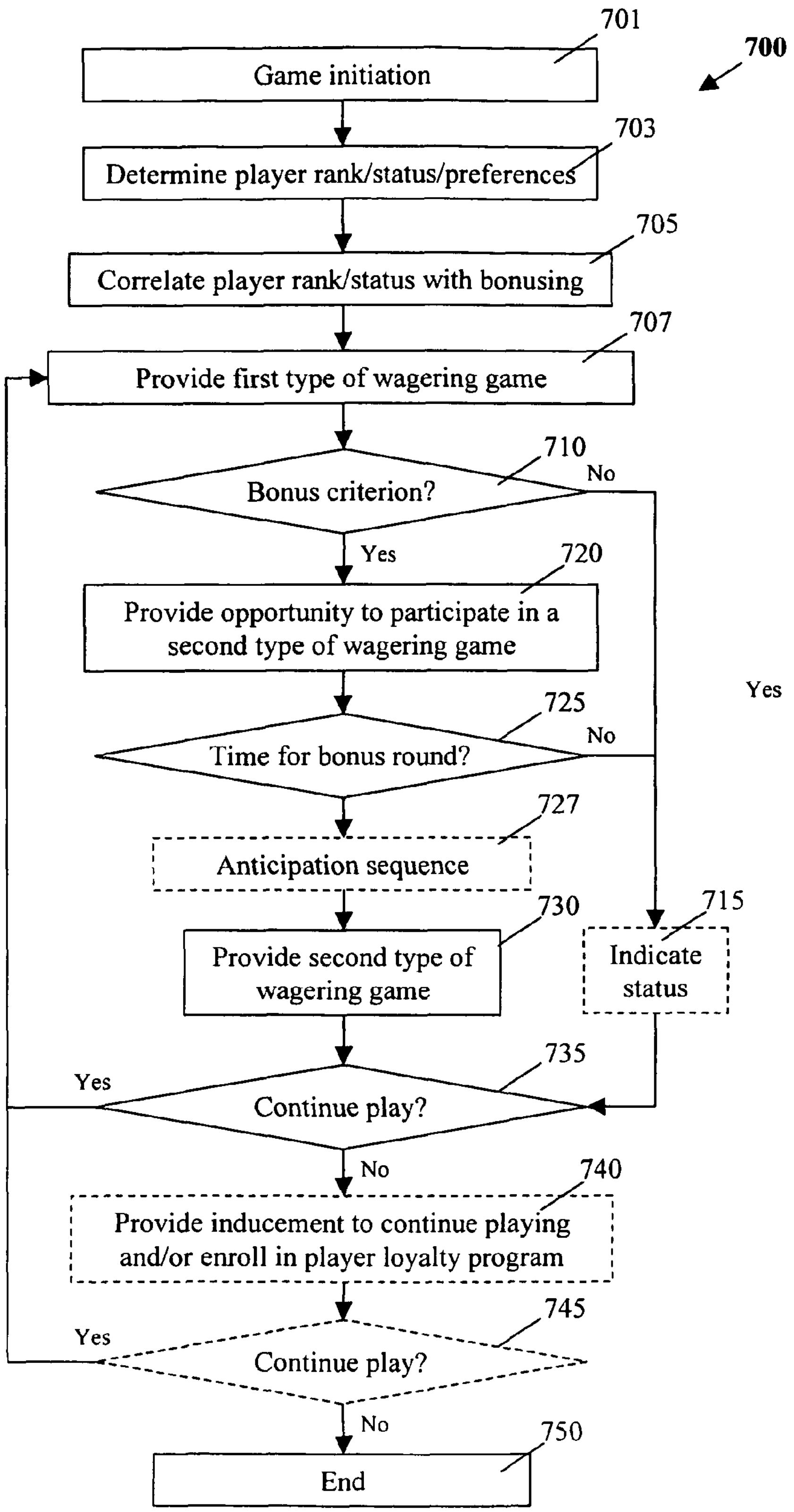
FIGS. 7A and 7B are flow charts that outline bonusing methods.

Referring now to FIG. 7A, method 700 of the invention will be described. It will be appreciated that the steps of method 700 (as with other methods described herein) are not necessarily performed in the order indicated. Moreover, these methods may include more or fewer steps than shown and/or described.

In step 701, a player initiates play of a wagering game, e.g., at a gaming machine. For example, the player may insert money, a ticket or another indicium of credit into the gaming machine to initiate play. The underlying game could be a slot game, a poker game, blackjack, keno, baccarat, roulette, pachinko, or another Class III game. Alternatively, the underlying game could be a Class II game, such as a Bingo game, a lottery-type game, a pulltab game, etc.

In step 703, a player's rank, status and/or preferences are determined. For example, a member of a player loyalty program may insert a player loyalty card, bring an RFID-enabled device associated with the program within range of an RFID reader, etc. A player's rank in the player loyalty program and/or preferences may be determined with reference to a database of the player loyalty program.

In some preferred implementations of the invention, a player's rank will be associated with levels of a bonus game, the likelihood of receiving an opportunity to participate in a bonus game, the award(s) that one may receive in a bonus game, and/or other such criteria. In some such implementations, higher-level players will only receive more Bingo cards or cards that provide relatively better odds and/or a higher-level prize. However, in other implementations, higher-level players may participate at various levels, e.g., according to their preferences.

In some such implementations, player preferences (for example, as determined from preference data stored in a database for a player loyalty program) may also be determined. Such data may be used, for example, to determine what types of bonus games to offer a player and/or the characteristics of the bonus games preferred by the player. For example, some players may prefer bonus Bingo games over other types of games. Some players may prefer bonus games in which the prize is relatively substantial, even if their chances of winning are relatively smaller. Other players may prefer bonus games in which their chances of winning are higher, even if the prize is not as great. For example, some players may choose to receive more bonus opportunities (e.g., more Bingo cards) that provide a relatively better chance of winning lower-level prizes than to receive fewer bonus opportunities (e.g., fewer Bingo cards) that provide a relatively lower chance of winning higher-level prizes.

In some implementations of the invention, the types of bonuses described herein are only awarded to members of a player loyalty program. Moreover, in some implementations of the invention, there is no player ranking.

However, in other implementations, at least some non-member players are eligible for such bonuses. Such implementations may be advantageous because a "higher-level" player may not necessarily be an upper-echelon member of a player loyalty program and may not be a member at all. Therefore, in some implementations, a non-member who has recently qualified at a high level due to, e.g., high levels of wagering may be eligible for relatively more favorable bonus treatment, whether in the form of larger potential awards, a higher likelihood of winning, etc.

In some such implementations, step 703 also includes a ranking process for non-members. For example, participation in bonus games may be determined, at least in part, according to a player ranking system based on average bet, max. bet, game denomination, etc. On the other hand, a member or non-member who has been playing a base game below a predetermined level (e.g., below a threshold denomination, wager rate, etc.) may not qualify for a bonus session in some such implementations.

One such process will now be described with reference to FIG. 8. FIG. 8 features table 800, which depicts a simplified data structure that may be stored, for example, in a storage device accessible to a server of a casino computer room. (Examples of such devices will be described in more detail below.) It will be appreciated that the ranking levels, numbers of players, numbers of bonus game levels, etc., are purely illustrative. Preferably, at least some of these factors are configurable by a gaming establishment.

In this example, there are 4 bonus game levels, A through D, with level A being the highest level. There are also 4 categories 810 for non-members. However, in this example, bonus level A is reserved for high-ranking members of a player loyalty program. The top 10 non-members (see Rank column 805) are assigned to the top non-member category and are associated with bonus game level B. (See column 815.) In some implementations, this association will mean that the top non-members will only have the option of participating in level B bonus games. In other implementations, this association will mean that the top non-members will have the option of participating in bonus games up to and including level B bonus games.

Similarly, players of rank 11 through 50 are categorized as moderate and associated with bonus game level C. Players of rank 51 through 100 are placed in the lowest category of non-members that may participate in a bonus game, in this case a level D bonus game. Other players may be monitored to determine whether their activities will, at some time, place them in a higher category.

The ranking process may be performed according to one or more variables, such as wager amount per unit time, a player's losses per unit time, or any other convenient variable or combination of variables. Data of this kind may be collected, for example, by a casino management system such as an IGT Advantage™ Casino System. Data regarding non-member players may be associated, for example, with identification numbers of the gaming machines at which these non-members are playing. Therefore, even without knowing a player's identity, data regarding the player can be compared to data for other players. The players may be ranked accordingly.

In some implementations of the invention, a non-member may be issued a temporary identification number that may be associated with data used for player ranking. Such an identification number may, for example, be encoded on a ticket, thereby allowing players of interest to be recognized when the ticket is used. Other potential advantages of providing such identification numbers are discussed below.

A casino may choose to direct resources other than those associated with bonusing (e.g., personalized casino services, beverage services, hotel services, etc.) to players, including non-members, who are ranked at a high level. Relevant methods and devices (including but not limited to the use of RFID networks and facial recognition techniques for non-member tracking) are described in U.S. patent application Ser. No. 11/655,496, entitled "DYNAMIC CASINO TRACKING AND OPTIMIZATION" and filed on Jan. 19, 2007, which is hereby incorporated by reference.

In some implementations, members of a player loyalty program may also be ranked according to similar criteria. For example, a member's ranking may initially be set to a "baseline" score corresponding to a level of the player loyalty program (e.g., 50 points for a bronze member, 100 points for silver, 200 for gold, etc.) Recent player activity may be used as a basis to increase or reduce that baseline score. The criteria may or may not be the same criteria used to rank non-members. In some such implementations, both members and non-members are included in the same "pool" of players who may or may not qualify for bonus games.

Moreover, one or more non-gaming criteria may be used for player ranking. For example, if a casino patron has spent more than a threshold amount on food, drinks, show tickets, retail, etc., the patron's ranking may be increased according to predetermined metrics.

After a player's rank/status has been determined, the player's rank/status is correlated with bonusing. (Step 705 of FIG. 7.) Referring now to FIG. 9, some examples of correlations between player ranking and bonusing will be discussed. FIG. 9 indicates a simplified data structure 900 that may be stored, for example, in a storage device accessible to a server of a casino computer room. The values indicated are purely by way of example. Preferably, at least some of these values, the number of bonus levels, etc., are configurable (e.g., by a gaming establishment).

In this example, both members and non-members may potentially be included in bonus games. Accordingly, player status field 905 indicates both non-members and silver, gold and platinum levels of a player loyalty program.

Fields 915, 920, 925 and 930 indicate the award frequency for indicia of eligibility for participation in corresponding levels of a bonus game. In this example, the bonus game is a Bingo game. Levels A, B, C and D have associated Bingo cards. The Bingo cards for each level are preferably differentiated in some fashion, e.g., by color, patterns, etc., so that the cards may readily be associated with the corresponding level. For example, the cards for lower levels may be “cool” colors such as blue or green and cards for higher level may be warmer/hotter colors such as red, yellow and/or orange.

However, any convenient manner of distinguishing the cards (or other indicia) may be used. For example, colors, patterns, logos, etc., associated with gold, jewels, treasure, money, levels of a base game, levels of a player loyalty program, features of an individual gaming establishment, etc., may be used to distinguish the cards. Alternatively, all cards may have essentially the same outward appearance. As noted elsewhere herein, in some implementations of the invention, the cards (or other indicia) may be awarded and/or purchased individually or in groups, which may be referred to herein as “card packs” or the like. The numbers of cards in a pack may or may not represent the number of bonus games in a bonus session.

As noted with reference to FIG. 8, in the current example non-members may not participate in the highest level of bonus games (level A bonus games). Accordingly, the corresponding entries of field 930 indicate that there is a 0% chance that a non-member will be offered an opportunity to participate in a level A bonus game. However, non-members of sufficient rank may participate in level B, C, or D bonus games.

The probabilities indicated in fields 915 through 930 indicate the odds that a player of the level indicated will be provided an opportunity to play a bonus game. The odds shown are for each instance of a game, e.g., for each hand of video poker, each “spin” of a slot game, etc.

Here, the probability that any player, member or non-member, will be provided an opportunity to play a bonus game is higher when the player has placed the maximum wager for an underlying or “base” wagering game. The probabilities generally decrease as the level of bonus increases. For example, a silver-level member of the player loyalty program normally has a 2% chance of being awarded a bingo card for playing a D level bonus game. (See field 915.) This probability increases to 4% if the player's bet was a “Max Bet” or the like for that instance of the underlying game.

A silver-level player may also participate in level C, B and A bonus games. (See field 930.) A silver-level player normally has a 1% chance of being awarded a Bingo card for a level C bonus game; this probability increases to 2% when making a maximum wager in the base game. (See field 920.) The odds are lower for a level B bonus game and lower still for a level A bonus game. (See fields 925 and 930.)

In some implementations of the invention, all bonus opportunities are presented at not cost to a player. In alternative implementations, at least some bonus opportunities require a player to “buy in” by exchanging something of value, such as game credits, money, player loyalty points, etc.

The implementation depicted by FIG. 9 involves a hybrid of “no cost” and “buy in” bonus opportunities. Here, a player's status determines not only whether a player is eligible to participate in a particular level of bonus game, but also whether the player will be required to pay for the bonus opportunity. For example, a platinum-level player may participate in bonus game levels A, B, C and D. Moreover, a platinum-level player does not need to buy in for any level of a bonus game. (See field 910: no buy-in required at any level.)

A gold-level player may also participate in bonus game levels A, B, C and D. However, a gold-level player's chances of having the opportunity to participate in all bonus game levels are lower than a platinum-level player's chances. (Compare, e.g., the gold and platinum levels for fields 915 and 920.) A gold-level player must also pay for the opportunity to play a level A bonus game. (See field 910.) In other words, in this embodiment a gold-level player may only participate in a level A bonus game if the player is provided the opportunity and the player pays for the opportunity, e.g., by exchanging player loyalty points, money or other indicia of credit.

In alternative implementations (some of which are described elsewhere herein), a player may “buy in” and participate in a bonus game without being presented the opportunity during the base game. In some such implementations, for example, a player may purchase Bingo cards for a bonus game before initiating play on the base game.

In the example shown in FIG. 9, a silver-level player must pay for the opportunity to play level A and level B bonus games. However, a silver-level player does not need to “buy in” to play level C or level D bonus games.

A non-member's chances of receiving an opportunity to play a level B, C or D bonus game are the same as those for a silver-level player. However, non-members must pay to play level B and level C bonus games. Moreover, only the highest-ranked non-members (in this example, the top 10 non-members) are eligible to play level B bonus games.

In the implementation described with reference to FIGS. 8 and 9, higher-level players may be provided the opportunity to play more than one level of bonus games. We have seen, for example, that a platinum-level player may play level A, B, C or D bonus games.

However, in alternative implementations, the level of a bonus game will correspond to player level. Preferably, a casino will have the ability to segment games according to player ranking, e.g., in the casino's player loyalty program, if the casino chooses to do so. In some such implementations, for example, high-level players will only have the option of participating in high-level bonus games. For example, a platinum-level player might only have the option of participating in level A or level B bonus games.

In these implementations, there may or may not be overlap in player levels and bonus game levels. For example, if a platinum-level player has the option of participating in level A or level B bonus games, a gold-level player may have the option of participating in level B or level C bonus games. However, in alternative implementations, there is no overlap between player levels and bonus game levels.

Some such implementations involve a one-to-one mapping between player level and bonus game level. For example, “gold” level players could participate in a bonus session with other gold level players, platinum with platinum, etc. In one such example, a platinum-level player may only have the option of participating in level A bonus games, a gold-level player may only have the option of participating in level B bonus games, and so on. A non-member may only have the option of participating in level D bonus games, or may not be allowed to participate in any bonus games.

Different levels of bonus awards may be assigned to the different levels/groups, with larger awards preferably being available to higher-level players. In order to make the bonus sessions even more interesting for high-level players, one could make the maximum number of players per session smaller for higher-level players, to allow a higher probability of winning. In addition, higher-level players may be provided with additional opportunities for winning, e.g., by having more than one potential winner of a bonus game. For example, if the bonus game is a Bingo game, some bonus games (e.g., high-level bonus games) may allow “interim wins” for hitting predetermined patterns on a Bingo card that are not game-winning patterns. Preferably, such options would be provided for high-level players but not for lower-level players.

Referring once again to FIG. 7A, in step 707 a first type of wagering game is provided to the players. For example, if a player had initiated play on a Star Wars® game in step 701 and had provided sufficient indicia of credit, that game would be provided in step 707.

In step 710, it is determined (e.g., by a bonus server) whether a bonus criterion has occurred. Probabilities such as those indicated in FIG. 9 may be associated with the odds of particular game events, such that a bonus criterion is determined in step 710 when the player achieves these game events. For example, a gold-level member who is playing video poker (but not making the maximum wager) may receive a C level Bingo card each time that a particular card is drawn first (e.g., the Ace of Diamonds). When the player is making the maximum wager, the player may receive a C level Bingo card each time that an Ace of Diamonds or an Ace of Hearts is drawn first. Similarly, the game events associated with bonus criteria may be game outcomes, e.g., 4 tens or better, 3 Aces or better, etc. As noted elsewhere, a chance to play bonus games could be triggered by other types of player activity, including "coin in"/wager amount within a time interval, "coin out," playing time, jackpots, game outcome (positive or negative), or even randomly.

Alternatively (or additionally), the bonus awards may be de-coupled from events in the base game. For example, bonus game opportunities may be awarded randomly, but according to predetermined probability levels. Bonus game opportunities may also be based on a combination of base game events and other events, the latter of which may or may not be random. For example, a casino may award one or more bonus game opportunities on a date of significance to a member (e.g., a birthday or anniversary), to "celebrate" a nearby player's large win, or according to other criteria that may, e.g., be determined by a gaming establishment. For example, bonus game opportunities may be made to players staying in an affiliated hotel, to players who have spent at least a threshold amount on non-gaming activities (e.g., food and beverage, retail, show tickets), etc. Some such bonus game opportunities may only be made to players in a player loyalty program, to players at or above a certain level in the player loyalty program, etc.

Bonus game opportunities may be awarded in connection with casino promotions, including but not limited to special events and targeted promotions. In one example of the latter type of promotion, a casino's top 2 tiers of players may be with a direct-mail offer, e.g., for a week of tournaments, special events, etc. These players could be eligible for bonus games (e.g. for bonus Bingo games) during their entire stay, e.g., for the entire week that they are there. The casino's gaming network could be configured accordingly, such that step 710 involves recognizing one of these players as being eligible for bonus games. These targeted players could be grouped and put into bonus games against one another, e.g., at predetermined times.

Whether or not an implementation uses a player ranking system, players could still qualify for bonus games based on recent gaming activity. For example, point thresholds, wagering thresholds, wager per unit time, wins or losses per unit time, or other metrics could be used to determine whether a bonus criterion has been established in step 710. In one simple example, a player may qualify by earning 500 player loyalty points in a day.

When a bonus criterion is determined in step 710, a player is provided an opportunity to participate in a second type of wagering game. (Step 720.) The second wagering game could be any type of wagering game, but in some preferred implementations the second wagering game is a Bingo game. As noted elsewhere herein, an opportunity to participate in a bonus game may be provided without cost to a player or may require a player to "buy in." For example, step 720 may involve either issuing one or more Bingo cards, or by providing an opportunity to exchange money, game credits, player loyalty points, etc., for one or more Bingo cards.

When no bonus criterion has been determined in step 710, a player's status and/or the status of a bonus game/session may optionally be indicated. (Step 715.) Such status indications may be made, for example, via an audio or video display of a gaming machine. Particularly for implementations in which there is an ongoing process of qualification for a bonus game, it may encourage players to know just what it would take for them to qualify for the next bonus game or game session. For example, the player could be notified when the player is within a certain number of player loyalty points, e.g., "You only need 20 more points to qualify for a bonus session!" For implementations in which a game events may be bonus criteria, a player could be informed that a bonus opportunity will be provided upon the next instance of a game event, e.g., "The next time you get 3 cherries, you can play in a top-level bonus round!" Such encouraging messages may keep players playing the base wagering game.

For implementations that provide bonus sessions at predetermined times, a similar prompt could be used to indicate the time of the next scheduled Bingo bonus round. For example, when it is determined in step 725 (e.g., by a bonus server or the like) that it is not yet time to begin a session of bonus games, players who have qualified (and/or could potentially qualify) for the session of bonus games may be notified. (Step 715.) For example, if the next scheduled level A bonus round is scheduled to occur in 5 minutes, all silver, gold and platinum members may receive a message such as, "The next top-level bonus round starts in 5 minutes!"

In some implementations of the invention, step 725 involves determining when enough players have qualified for a bonus game or a session of bonus games. Such implementations may involve a rolling buy-in and/or ongoing player qualification. For example, a bonus session may be initiated after 10 players have qualified and/or bought in. For implementations in which players may "buy in" without qualification, eligible players may be encouraged to do so via a notice sent over the network, e.g., "The first 2 players to sign up can participate in the next Bingo bonus!" Or, "We only need 1 more player to start a bonus round! Sign up now!" (Step 715.)

However, similar prompts may be provided in order to encourage more players to sign up, even after there are enough players for the next bonus round. For example, a gaming establishment may determine a minimum number of players for a bonus round and an optimal or desired number of players. Having a larger number of players may be particularly beneficial for implementations wherein prizes for bonus games are at least partially funded by player buy-in. If it appears that the desired number of players will qualify and/or buy in within a predetermined period of time, the gaming establishment may delay a bonus session until either (1) the desired number of players has qualified and/or bought in or (2) a predetermined period of time has elapsed. The decision to delay may be based, for example, on a rate of player qualification and/or buy-in.

When it is determined in step 725 that it is time for a bonus game and/or a bonus game session, some type of anticipation sequence is preferably used to generate player excitement. (Step 727.) For example, there may be an announcement (audio and/or video) indicating when the session is about to start, e.g., "Get ready to play Bingo!" These announcements could be made via gaming machines (e.g., via the speakers of the NexGen® system) and/or via other devices, such as overhead displays, a public address system, etc.

The anticipation sequence may involve specific attributes of the bonus game and may continue during a bonus game/session. For implementations in which the bonus games are Bingo games, for example, there may be Bingo "ball drop" sounds or other Bingo-related sounds in the background, some Bingo graphics, etc., when a Bingo bonus session is about to start. Casino patrons will learn that when those sounds are heard, a Bingo bonus session is about to start or is under way. Patrons would also learn to recognize sights and sounds associated with a prize award. Players' excitement and interest in the bonus games would be increased. In some implementations, public address systems and the like are only used when there is a big win. Selective use of such sounds and/or displays may help to create player excitement and may help patrons to differentiate such sounds from the background noise of a casino.

In step 730, at least one instance of the second type of wagering game is provided as a bonus to participating players. Some preferred implementations of the invention provide a session of bonus games in step 730, which may or may not be a session of Bingo games.

In some "member only" implementations, a player needs to have a player loyalty card inserted in a gaming machine in order to qualify for participation in a bonus session. In some such implementations, one of 4 things will happen when a player removes the card during a bonus session: (1) the player will be allowed to remain in the bonus round; (2) the player will be disqualified from participation in the bonus round; (3) the player will be prompted to re-insert the card, then disqualify the player from participation if the player does not; and/or (4) the player will be allowed to rejoin a session if the card is re-inserted later on in the session (possibly even if the card is inserted in another machine). The player may be given a predetermined period of time to rejoin the session. The session data would be stored, e.g., on the gaming machine, on a portable storage device (e.g., on a player loyalty card or the like) and/or at the server/central system level.

If a player quits and rejoins during a single game, the player may or may not be able to qualify for a win. Information regarding a player's Bingo card could, for example, be saved at the server level and the card could continue to be populated by "hits" when the virtual Bingo balls are drawn. The player might be required to re-insert a player loyalty card within a predetermined time (e.g., before the end of the game or the session) in order to obtain credit for the win. Preferably, this should be resolved during a bonus game, because otherwise there could be confusion about which player has won a bonus game.

If a player tries to join a bonus session after it starts, various consequences could ensue. In some implementations, the player would be ineligible to participate in the bonus session. However, in other implementations, the player would be eligible to participate in at least the remaining games of a bonus session.

Figure 10A:
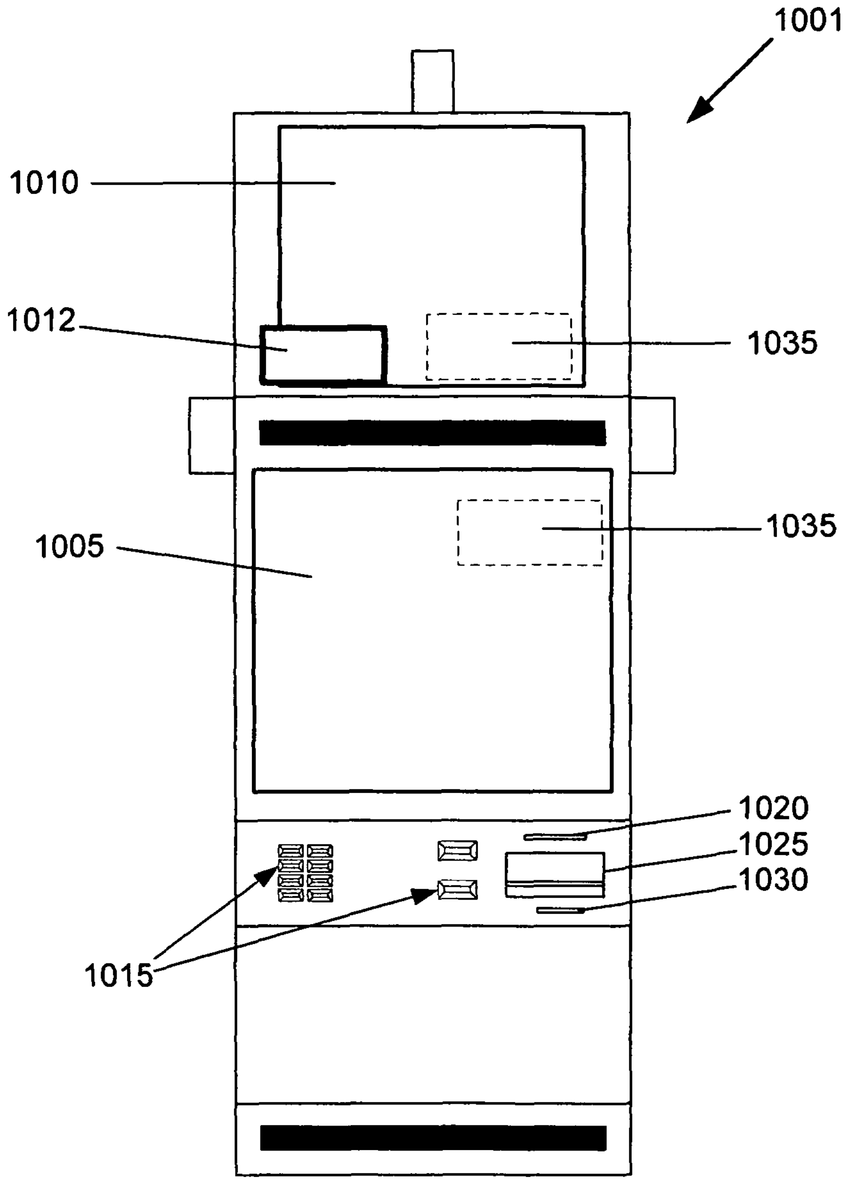
FIGS. 10A and 10B illustrate options for displaying a base wagering game and a bonus game on a multi-display gaming machine.

In some implementations of the invention, the bonus game(s) will be provided on the same gaming machine that the players were using to play the base game. Some such implementations will now be described with reference to FIGS. 10A and 10B. Referring first to FIG. 10A, gaming machine 1001 includes primary display 1005, secondary display 1010 and player loyalty display 1012. Gaming machine 1001 includes various controls 1015 for indicating game play options, wagering options, etc. Gaming machine 1001 also includes payment instrument validator 1025, ticket printer 1030 and reader 1020. Reader 1020 may be configured to read magnetic cards, RFID tags, etc. Some implementations of gaming machine 1001 include a separate player loyalty module, having a separate reader configured for reading player loyalty cards or the like.

Primary display 1005 may be used to display, for example, a primary wagering game. In some server-based implementations, secondary display 1010 may be used as a "digital glass," to display a game theme name, logos and the like.

A bonus game may be displayed, for example, in player loyalty display 1012. For example, bonus games may be displayed in a NexGen® player loyalty display screen/control panel provided by IGT. NexGen® provides a touch-screen display device with associated audio. A member of a player loyalty program can use the screen to access player loyalty data via a secure transaction. A NexGen® device may also act as an advertising medium. NexGen® units may have associated streaming video, animation, etc. Alternatively, bonus games may be presented in a window 1035 of primary display 1005 or secondary display 1010.

Figure 10B:
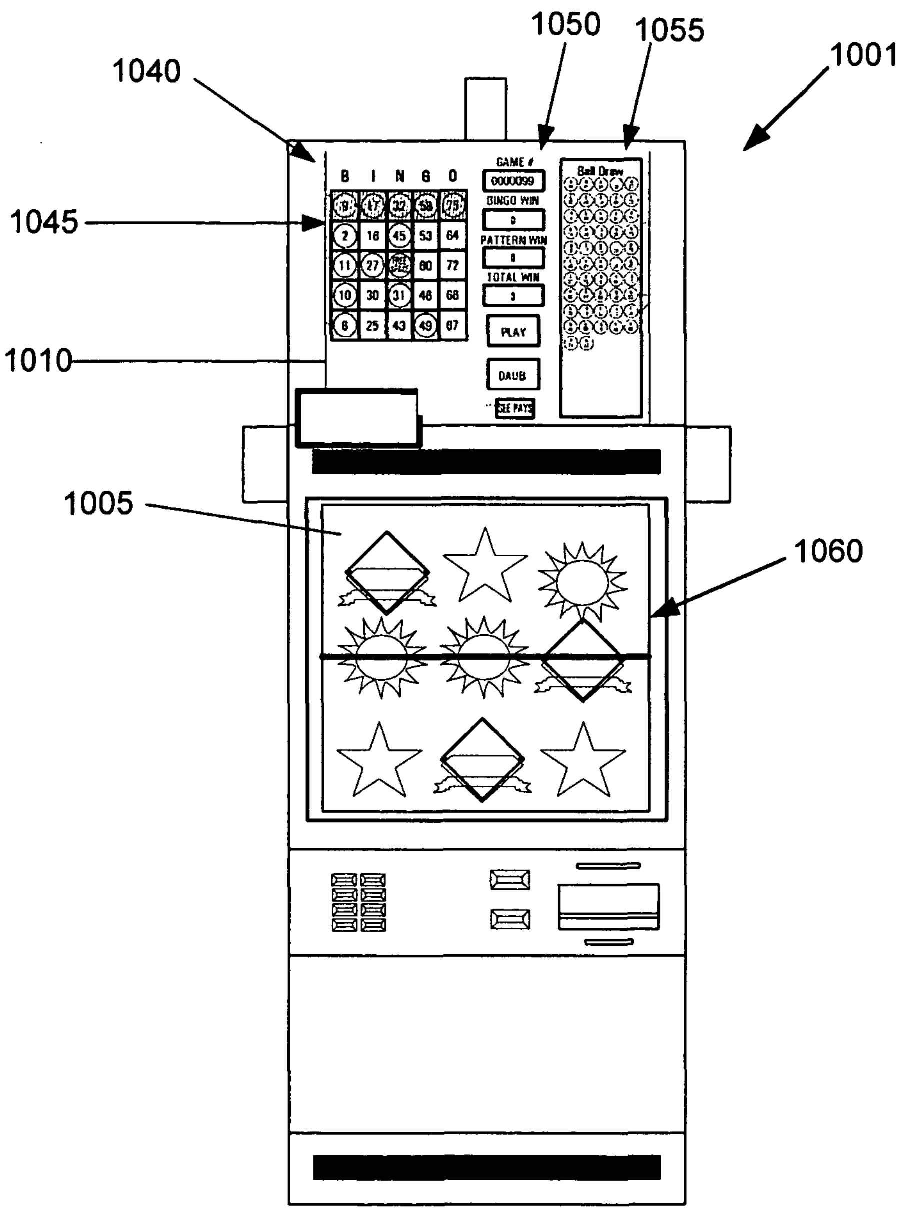

However, in some implementations of the invention, secondary display 1010 may be used to present a bonus game. One such implementation is depicted in FIG. 10B. Here, primary display 1005 displays the last outcome of a base wagering game, which is a slot game in this example. Secondary display 1010 is displaying a bonus game, which happens to be a Bingo game. Bingo card 1045 indicates the pattern of "hits" caused by the Bingo balls drawn. (See "Ball Draw" window 1055.)

Area 1050 provides information such as game number and win information. In the type of Bingo game illustrated in FIG. 10B, a player may win a prize either by hitting a game-winning pattern or an "interim win" pattern on Bingo card 1045. The "Play," "Daub" and "See Pays" portions of area 1050 may be activated by touching secondary display 1010.

A player's bonus prize may be awarded, for example, by dispensing indicia of credit (which may or may not be currency) or by crediting a player's account (e.g., with the gaming establishment or with a financial institution). For example, a bonus prize may comprise player loyalty points. A bonus prize may also be awarded by increasing a credit meter of the gaming machine and/or by providing "free spins" or the like for the base wagering game. Some such implementations involve the use of Xtra Credit® bonuses or the like. Xtra Credit® bonuses are electronic "currency" that appears on the system display, which must be played through the gaming machine. Winnings go to the game's credit meter, but Xtra Credit® rewards cannot be cashed out. Alternatively, a bonus prize may be awarded by providing some other form of "cashless" credit. The gaming machine may, for example, issue a ticket (e.g., an EZ-Pay™ ticket), credit a "smart card" etc. A bonus prize may also involve an invitation to play in a tournament, in future (e.g., higher-level) bonus sessions, etc. A bonus prize may be a specific prize, such as a bicycle, jewelry, clothing, etc. High-value bonus prizes may be awarded via "hand pay," e.g., in order to comply with tax requirements, to verify that the prize was won fairly, etc.

In some "buy in" embodiments, players may use similar methods to pay for participation in bonus games. A player may, for example, swipe a card or insert a ticket in a gaming machine, a kiosk, etc., and select a level of participation in bonus games. The player's account would be debited according to the selected level of participation. The account may be a player tracking account, an account with a financial institution, etc. Accordingly, some gaming machines of the invention may include a credit or debit card reader and the necessary hardware and software necessary network connectivity, etc. for secure communications with a financial institution.

Figure 13:
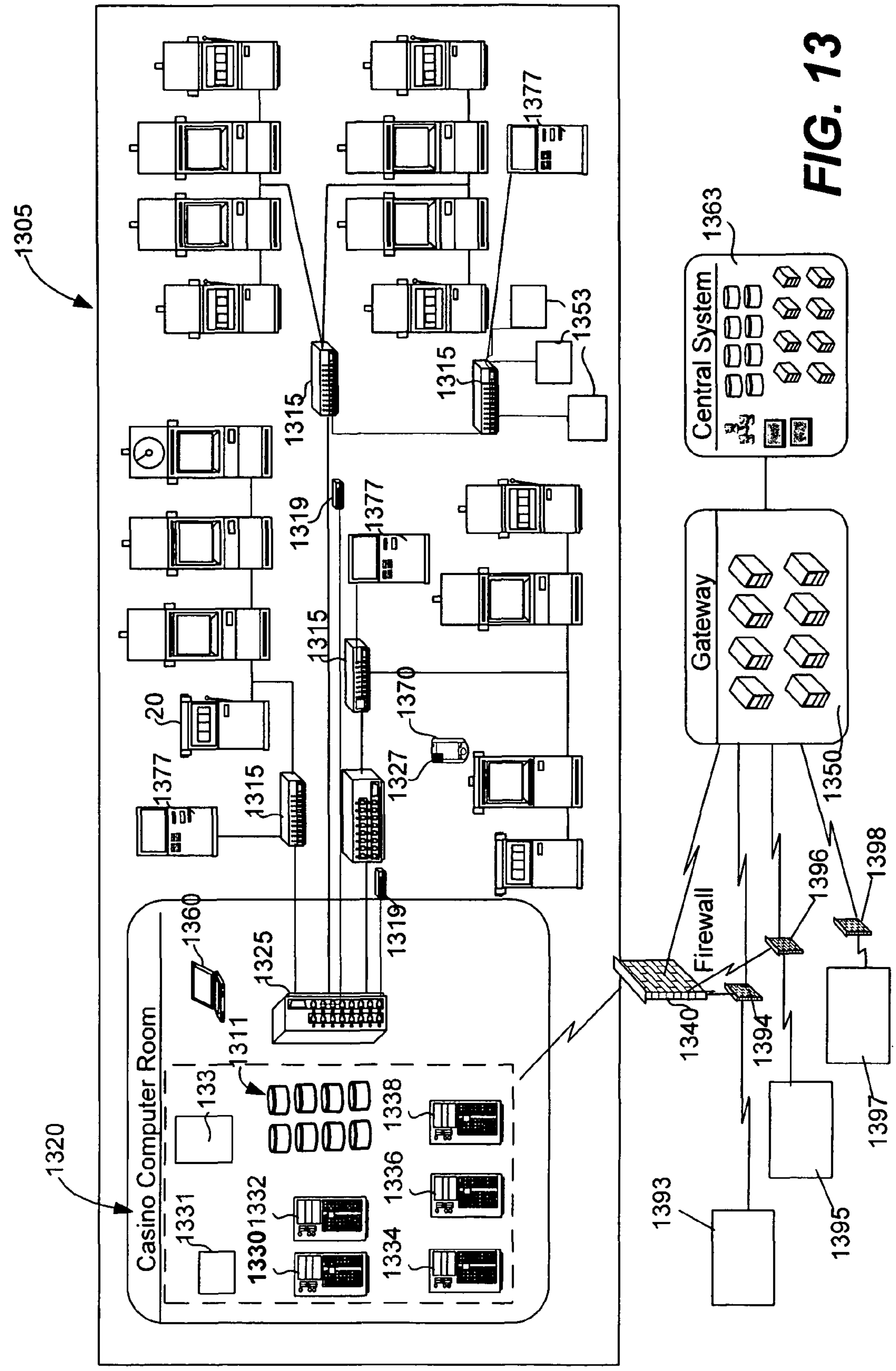
FIG. 13 is a network diagram illustrating some components of a server-based gaming network.

Alternatively, or additionally, transactions such as bonus ticket purchases, cashouts, prize distribution, etc., may be performed at a kiosk, such as kiosk 1377 of FIG. 13. Such a kiosk may have features such as a ticket reader, a credit, debit and/or player loyalty card reader, a cash dispenser, etc., to facilitate such transactions.

Referring once again to FIG. 7A, after a bonus game or session, it is determined whether a player will continue playing the base game. (Step 735.) If the player indicates an intention to continue playing the base game (e.g., by pressing a "Play" button, providing additional indicia of credit, etc.), the base game will be provided. (Step 707.)

However, if the player indicates an intention to stop playing the base game (e.g., by hitting a "Cash Out" button, withdrawing a player loyalty card, etc.), an inducement may be provided to the player to keep playing. (Step 740.) If the player is a non-member, the player may also be encouraged to join a player loyalty program. The inducement could involve extra bonus games, "free" player loyalty points, etc.

A player who has indicated an intention to stop playing the base game may have remaining opportunities for bonus games. For example, a player may have just completed a level C Bingo bonus round, but may still have Bingo cards for a level D Bingo bonus round. Such opportunities may or may not persist after a player stops playing a base game. If a player has opportunities for additional bonus games, the inducement for a non-member (step 740) may simply be a reminder that these opportunities will be lost unless the player enrolls in a player loyalty program.

Figure 7B:
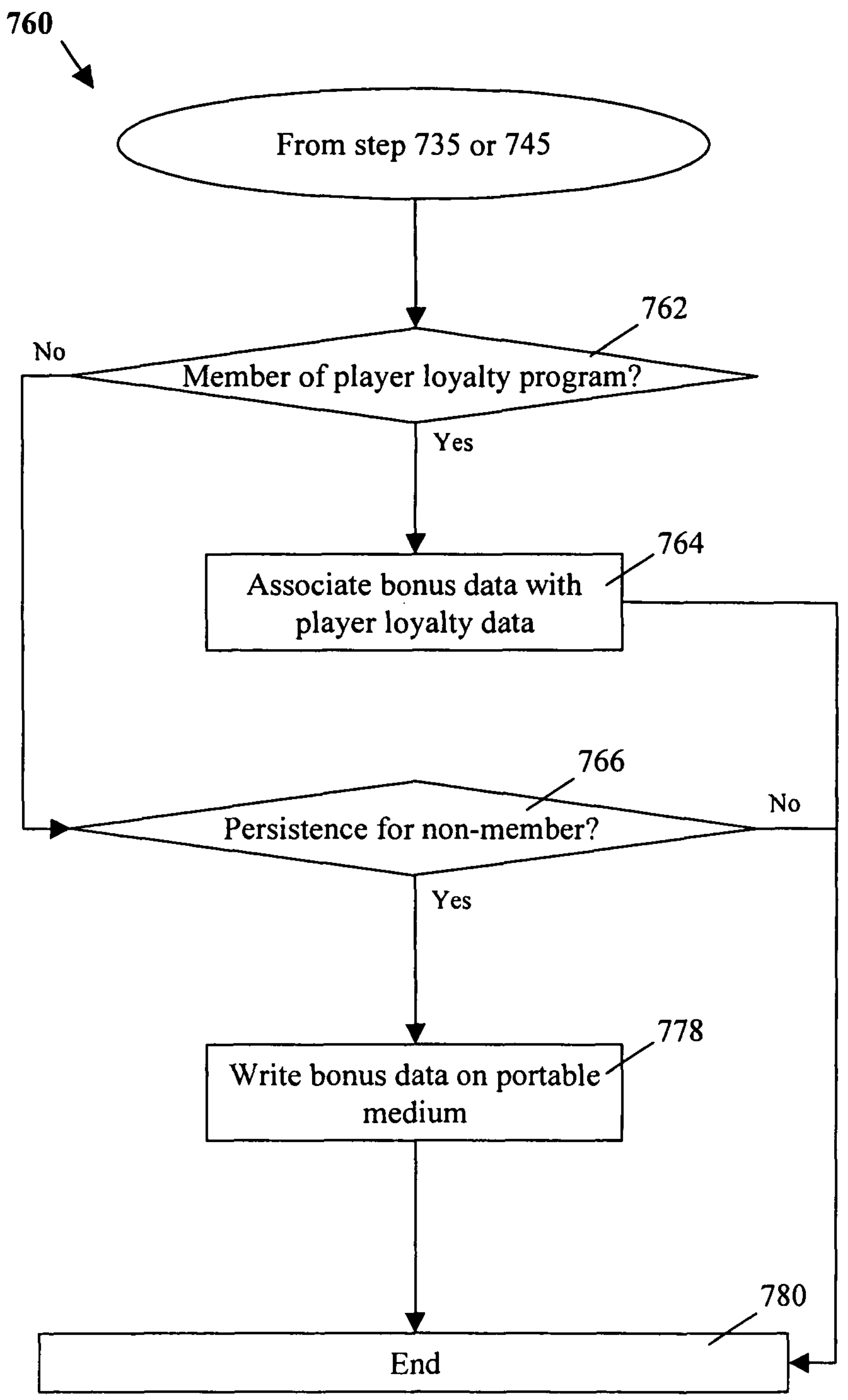

The treatment of accrued bonus opportunities upon stopping play on a base game may differ according to the implementation. FIG. 7B sets forth steps of method 760 that may be invoked after a player has indicated an intention to stop playing the base game, e.g., after step 735 or step 745. For members of a player loyalty program (as determined/verified in step 762), it is preferable that accrued bonus opportunities will persist for future game play. Therefore, data regarding accrued bonus opportunities may be associated with the member's other player loyalty data and stored, e.g., in a central database. (Step 764.) Alternatively, or additionally, such data may be stored locally, e.g., in a portable storage medium (such a player loyalty card, dongle or other such device).

There are potential advantages and disadvantages of allowing accrued bonus opportunities to persist for non-member players. Non-persistence has its virtues. As noted above, a reminder that a non-member is about to lose accrued bonus opportunities may inspire the non-member to join a player loyalty program. Non-persistence also allows the gaming establishment to delete the relevant data regarding accrued bonus opportunities and avoid any potential bonus award that may have been obtained by the non-member player.

However, a gaming establishment may decide to allow at least some non-member players (e.g., high-level non-member players) to retain their accrued bonus opportunities. Such persistence could enhance a desirable non-member's opinion of the casino. If it is determined that a non-member's accrued bonus opportunities will persist (step 766), data regarding these accrued bonus opportunities may be written to a portable medium, such as a ticket or a portable storage device. An additional benefit is provided to the casino when the high-level non-member resumes play and uses the portable medium: if only high-level non-members can save their accrued bonus opportunities, use of a ticket having such data indicates the presence of a highly-ranked player.

As noted above, in some implementations an identification number may be associated with at least some non-member players, e.g., high-level non-member players. The number may be associated with the player's gaming data, including but not limited to data used for player ranking. If such an identification number is encoded on the ticket, data corresponding to the non-member's past gaming sessions may be referenced by a casino manager or the like, if so desired.

Figure 11:
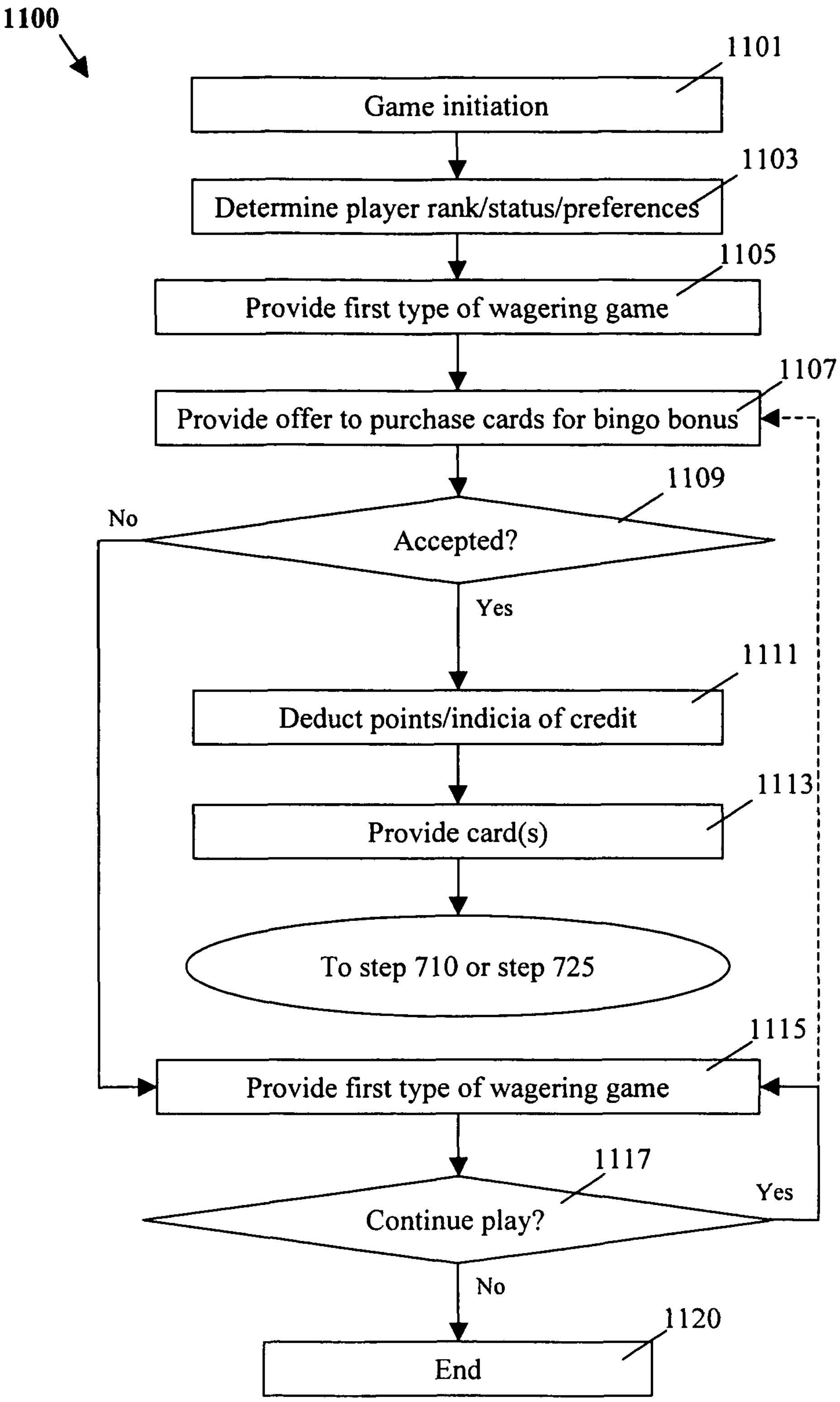
FIGS. 11 and 12 are flow charts that outline alternative bonusing methods.

FIG. 11 indicates the steps of method 1100, which is another example of a "buy-in" implementation. As before, a player initiates play of a base game (step 1101), the player's rank, status and/or preferences are determined (step 1103), and the base game is provided. (Step 1105.) In this example, a player may buy into a bonus game and/or session of bonus games. Specifically, a player is provided with an opportunity to purchase cards for at least one Bingo bonus session. (Step 1107.) Preferably, the cards available to the player depend on the player's rank/status, as determined in step 1103.

As before, the cards may be provided in exchange for, e.g., money, player loyalty points or any other convenient indicia of credit. If the player accepts the offer (e.g., by interacting with a user interface of a gaming machine), such indicia of credit will be obtained from the player. For example, the indicia of credit may be obtained by deducting them from the gaming machine's meter, from the player's account with the gaming establishment or a financial institution, etc. (Step 1111.) Bingo cards (here, electronic representations of Bingo cards) are provided to the player. For example, "thumbnails" of Bingo cards may be displayed in a window of a display on the gaming machine. In other implementations, electronic representations of Bingo cards (or the like) are not provided to the player until the actual bonus session.

As with other methods described herein, the steps of method 1100 are not necessarily performed in the order indicated. For example, in some implementations a player may purchase a Bingo card (or otherwise arrange for participation in one or more bonus games) before initiating play of the base game. The player may make the purchase at a kiosk, at a cashier's station, at a gaming machine, etc. However, if there is a hierarchy of bonus games that depend on, e.g., a player's level in a player loyalty program, it is preferable that this status be determined before a player purchases Bingo cards (or other such indicia).

In this example, the process flow continues to step 710 or step 725 of method 700. (See FIG. 7A.) However, other implementations may provide different steps than are shown and described with reference to method 700. For example, some such methods may be based purely on player buy-in and may not involve a further evaluation of bonus criteria associated with events in the base wagering game.

If it is determined in step 1109 that the offer is not accepted, the base wagering game will be provided (step 1115) until the player indicates that he or she does not wish to continue play (as determined in step 1117). In some implementations, the player may receive additional inducements to purchase Bingo cards (step 1107).

In some implementations of the invention, a bonus game presentation can take place in a different location and/or at a different time from that of the base game presentation. For example, a player may play a base wagering game on a first device (e.g., a gaming machine) and play (or at least view) a bonus game on a second device (e.g., a portable gaming device, cellular telephone, PDA, laptop computer, desktop computer, etc.). The first and second devices may or may not be located in a gaming establishment.

Figure 12:
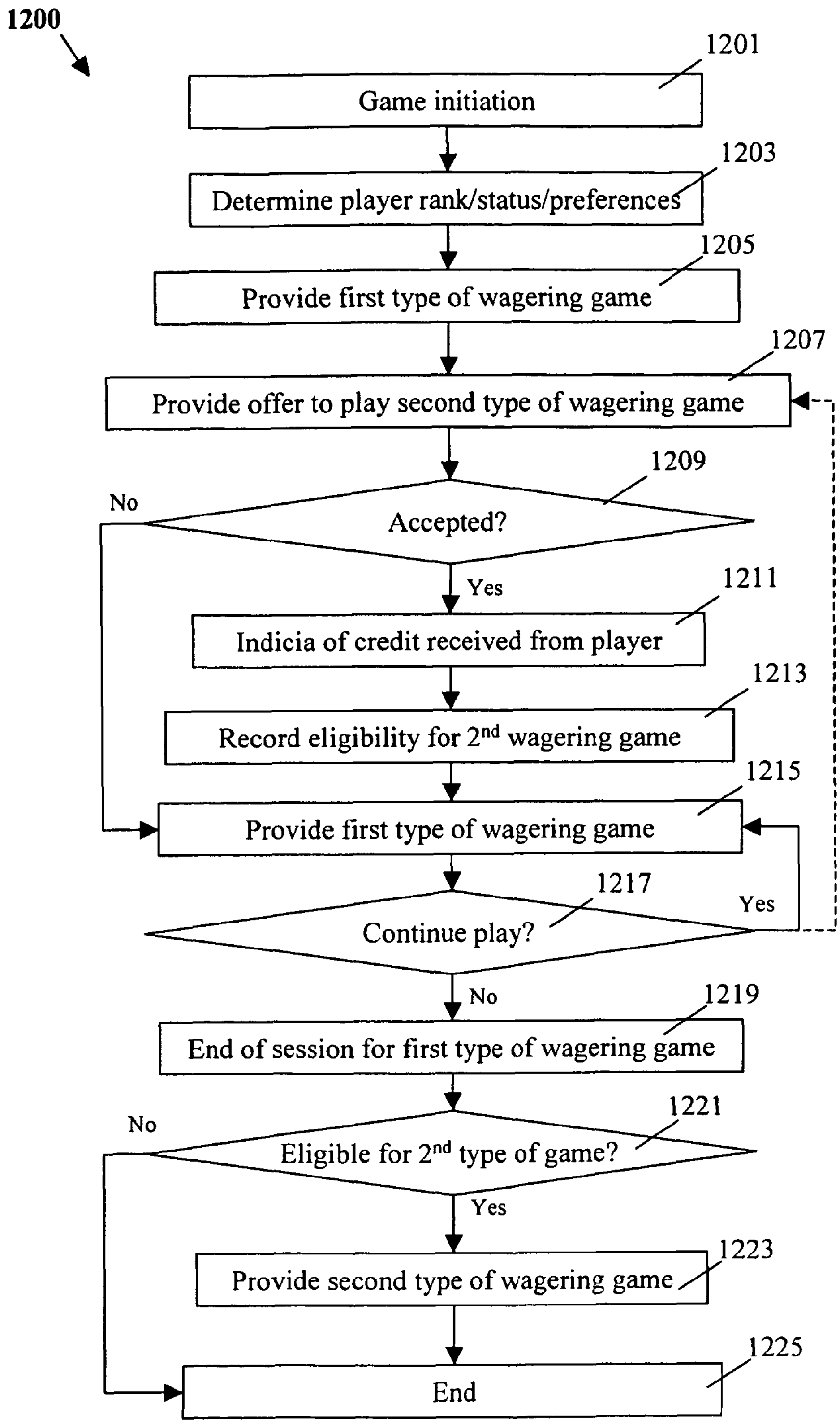

Some such implementations will now be described with reference to FIG. 12. Method 1200 encompasses some alternative "buy in" implementations. However, methods for presenting a bonus game in a different location and/or at a different time from that of the base game need not involve "buy in" options. Moreover, in alternative implementations, the player may be provided an opportunity to by into one or more bonus games before initiating play on the base game.

Some implementations of method 1200 begin in a fashion similar to that of some other methods described herein. A base game is initiated (step 1201), player rank/status is determined (step 1205) and a first type of wagering game is provided. (Step 1205.) In step 1207, a player is offered the opportunity to buy into one or more bonus wagering games.

If the offer is accepted, cash or non-cash indicia of credit are received from the player (step 1211) and a record is made of the player's eligibility to participate in the bonus wagering game(s). (Step 1213.) For example, a file may be stored in a database accessible to a bonus server or similar device. The file preferably includes information regarding the player's eligibility to participate in the bonus wagering game(s), including but not limited to the type of game, the time the game(s) will take place (if the game is a scheduled game), the level of the game, the number of game instances for which the player is eligible, etc. If the game is a Bingo game, the data may include a specific Bingo card layout, Bingo numbers, etc. The file may include identity information pertaining to the player and/or to one or more other devices on which the bonus game may be presented.

In step 1215, the player plays the base wagering game. During the course of play, the player may or may not receive additional opportunities for participating in bonus games, according to the implementation. In such implementations, the player may or may not need to "buy in" have the option of participating in bonus games. Additional data may be stored, as needed, to update the record of the player's eligibility for bonus games.

When it is determined that the player wishes to stop playing the base wagering game (step 1217), the player may be induced to continue play and/or enroll in a player loyalty program, as described with reference to FIGS. 7A and 7B. When the session ends (step 1219), the player's account(s) are preferably reconciled with regard to player loyalty points, etc. For non-members, eligibility data for bonus games, if any, may or may not be persistent. If so, such data may be recorded on a portable medium, such as a ticket or a portable storage device. In some implementations of the invention, locally-stored records of bonus game eligibility (e.g., files temporarily stored on the gaming machine) may be written to a central storage device and/or a portable medium.

At some later time, such eligibility data are evaluated to determine whether the player is eligible for one or more bonus games. (Step 1221.) This evaluation may involve player identification, particularly if the player seeks to play or reproduce the bonus games on a device other than a gaming machine. For example, some implementations allow a player to view at least some aspects of the bonus game(s) outside a gaming establishment, e.g., on a device in communication with a gaming network via the Internet or another network.

If the player will actually be participating in a bonus game while outside a gaming establishment, the player's location and jurisdiction may also need to be evaluated. The player's participation should not be authorized if such participation would violate the laws of that jurisdiction. Relevant methods and devices are described in U.S. patent application Ser. No. 10/981,435, entitled "LOCATION AND USER IDENTIFICATION FOR ONLINE GAMING" and filed on Nov. 3, 2004, which is hereby incorporated by reference.

Step 1221 may also involve a determination as to whether the bonus game(s) have already been played. In some implementations, for example, if a player attempts to play a bonus game after the game has taken place, it will be determined in step 1221 that the player is no longer eligible to play. For example, the player may have a paper ticket on which bonus game eligibility data were printed when the player ended a session of playing the base game. The bonus game eligibility data may indicate that the player can participate in a session of top-level Bingo games scheduled to begin at 3:00 p.m. on a particular day. If the player were to insert the ticket into a gaming machine after that date and time, the player could simply be informed that he or she is ineligible, that the bonus game session has already taken place, etc. The process would end. (Step 1225.)

In alternative implementations, however, a player does not need to participate in the bonus games and/or to view the bonus game presentations at the time the bonus games are played. Instead, bonus game data may be stored, e.g., in a database accessible by a casino's computer center, for later viewing. In some such implementations, only game outcome data will be presented to the player. This feature may simplify the evaluation process of step 1221 in some instances, because the player's location and the laws of that jurisdiction may not need to be determined. For example, the player may be able to view images, video and/or audio data regarding bonus games that have already been played in a casino (or at least within a jurisdiction wherein such wagering games are legal), while the player is in a jurisdiction that does not permit such wagering games. The bonus games may have been played in a casino in Las Vegas, for example, whereas the player may choose to view an entertaining display of the game outcomes from her home in Los Angeles.

Preferably, a gaming establishment should be able to configure which game themes, gaming machines, etc., will be associated with bonus games of the present invention. A gaming establishment may choose to enable participation in such bonus games on a single machine, a bank of machines, games of at least a threshold denomination, the entire slot floor or any combination of machines on the slot floor. The gaming machines (and, in some implementations, table games and/or gaming devices associated with table games) involved are preferably selectable by the casino.

Therefore, some implementations described herein provide methods and devices for implementing what will sometimes be referred to herein as "server-based" or "sb™" gaming networks. Such networks provide gaming establishments great flexibility for providing the present invention. For example, sb™ networks may provide a wide range of options for selecting which devices, game themes, etc., are potentially involved with obtaining and/or presenting bonus game opportunities. Some such gaming networks allow for the convenient provisioning of networked gaming machines and allow additional game themes to be easily and conveniently added or changed, if desired. Related software, including but not limited to game software and peripheral software, may be downloaded to networked gaming machines. Electronic representations of Bingo cards (or the like) may be downloaded to gaming machines or other devices, e.g., for bonus game presentations.

Relevant information is set forth in U.S. patent application Ser. No. 11/225,407, by Wolf et al., entitled "METHODS AND DEVICES FOR MANAGING GAMING NETWORKS" and filed Sep. 12, 2005, in U.S. patent application Ser. No. 10/757,609 by Nelson et al., entitled "METHODS AND APPARATUS FOR GAMING DATA DOWNLOADING" and filed on Jan. 14, 2004, in U.S. patent application Ser. No. 10/938,293 by Benbrahim et al., entitled "METHODS AND APPARATUS FOR DATA COMMUNICATION IN A GAMING SYSTEM" and filed on Sep. 10, 2004, in U.S. patent application Ser. No. 11/225,337 by Nguyen et al., filed Sep. 12, 2005 and entitled "DISTRIBUTED GAME SERVICES" and in U.S. patent application Ser. No. 11/173,442 by Kinsley et al., filed Jul. 1, 2005 and entitled "METHODS AND DEVICES FOR DOWNLOADING GAMES OF CHANCE," all of which are hereby incorporated by reference in their entirety and for all purposes.

One example of a network topology for implementing some aspects of the present invention is shown in FIG. 13. Those of skill in the art will realize that this architecture and the related functionality are merely examples and that the present invention encompasses many other such embodiments and methods. Here, casino computer room 1320 and networked devices of a single gaming establishment 1305 are illustrated. In some implementations, other gaming establishments are also in communication with at least some devices of casino computer room 1320: in this example, gaming establishments 1393 and 1395 are configured for communication with casino computer room 1320. Location 1397 is not in communication with other gaming establishments, but is configured for communication with central system 1363 via gateway 1350. Some gaming establishments (not shown) may not be in communication with other gaming establishments or with a central system.

Gaming establishment 1305 includes multiple gaming machines 20, each of which is part of a bank 1310 of gaming machines 20. In this example, gaming establishment 1305 also includes a bank of networked gaming tables 1353. Such networked gaming tables 1353 may be configurable. Some gaming tables 1353 may include individual gaming terminals for providing electronic versions of blackjack, baccarat, roulette, etc. It will be appreciated that many gaming establishments include hundreds or even thousands of gaming machines 20 and/or gaming tables 1353, not all of which are included in a bank. However, the present invention may be implemented in gaming establishments having any number of gaming machines, gaming tables, etc.

Gaming establishment 1305 also includes networked kiosks 1377. Depending on the implementation, kiosks 1377 may be used for various purposes, including but not limited to cashing out, prize redemption, redeeming points from a player loyalty program, redeeming "cashless" indicia such as bonus tickets, smart cards, etc. In some implementations, kiosks 1377 may be used for obtaining information about the gaming establishment, e.g., regarding scheduled events (such as tournaments, entertainment, etc.), regarding a patron's location, etc.

In some implementations of the invention, a patron may be able to arrange for participation in a "bingo bonus" or the like via one of kiosks 1377. For example, a patron may be able to purchase game cards and/or game card packs via one of kiosks 1377. In such embodiments, a player may be able to exchange cash, tickets, player loyalty points, game credits, etc., for a bonus opportunity, e.g., for one or more bingo cards. However, a patron could also purchase game cards, etc., in other ways. For example, a patron may purchase game cards, game packs, etc., from an attendant, from a cashier, from another type of device, etc.

In this example, each bank 1310 has a corresponding switch 1315, which may be a conventional bank switch in some implementations. Each switch 1315 is configured for communication with one or more devices in computer room 1320 via main network device 1325, which combines switching and routing functionality in this example. Although various floor communication protocols may be used, some preferred implementations use IGT's open, Ethernet-based SuperSAS® protocol, which IGT makes available for downloading without charge. However, other protocols such as Best of Breed ("BOB"), Game to System ("G2S"), etc., may be used to implement various aspects of the invention. IGT has also developed a gaming-industry-specific transport layer called CASH that rides on top of TCP/IP and offers additional functionality and security.

Here, gaming establishment 1305 also includes an RFID network, implemented in part by RFID switches 1319 and multiple RFID readers (not shown). An RFID network may be used, for example, to track objects (such as mobile gaming devices), patrons, etc., in the vicinity of gaming establishment 1305. Some examples of how an RFID network may be used in a gaming establishment are set forth in U.S. patent application Ser. No. 11/655,496, entitled "DYNAMIC CASINO TRACKING AND OPTIMIZATION" and filed on Jan. 19, 2007 and in U.S. patent application Ser. No. 11/599,241, entitled "DOWNLOADING UPON THE OCCURRENCE OF PREDETERMINED EVENTS" and filed on Nov. 13, 2006, both of which are hereby incorporated by reference.

In this example, mobile device 1370 includes RFID tag 1327, which includes encoded identification information for mobile device 1370. Accordingly, the location mobile device 1370 in gaming establishment 1305 may be tracked via the RFID network. Other location-detection devices and systems, such as the global positioning system ("GPS"), may be used to monitor the location of devices in the vicinity of gaming establishment 1305 or elsewhere.

Various alternative network topologies can be used to implement different aspects of the invention and/or to accommodate varying numbers of networked devices. For example, gaming establishments with large numbers of gaming machines 20 may require multiple instances of some network devices (e.g., of main network device 1325, which combines switching and routing functionality in this example) and/or the inclusion of other network devices not shown in FIG. 13. For example, some implementations of the invention include one or more middleware servers disposed between kiosks 1377, RFID switches 1319 and/or bank switches 1315 and one or more devices in computer room 1320 (e.g., a corresponding server). Such middleware servers can provide various useful functions, including but not limited to the filtering and/or aggregation of data received from switches, from individual gaming machines and from other player terminals. Some implementations of the invention include load-balancing methods and devices for managing network traffic.

Storage devices 1311, sb™ server 1330, License Manager 1331, Arbiter 133, servers 1332, 1334, 1336 and 1338, host device(s) 1360 and main network device 1325 are disposed within computer room 1320 of gaming establishment 1305. In practice, more or fewer devices may be used. Depending on the implementation, some such devices may reside in gaming establishment 1305 or elsewhere. Some of these servers may be configured to perform tasks relating to accounting, player loyalty, bonusing/progressives, configuration of gaming machines, etc. One or more such devices may b used to implement a casino management system, such as the IGT Advantage™ Casino System suite of applications, which provides instantaneous information that may be used for decision-making by casino managers. Preferably, a Radius server and a DHCP server are also configured for communication with the gaming network. Some implementations of the invention provide one or more of these servers in the form of blade servers.

Some servers, host devices and/or other devices in gaming establishment 1305, including those in computer room 1320, may be configured to perform tasks specific to the present invention. For example, one or more devices may be a bonus controller configured to perform bonus-related functions. In one example, a server configured as a bonus controller may trigger bonusing events, control bonus games and/or make reports regarding bonuses. In some implementations of the invention, a bonus controller may reference one or more databases (e.g., a player loyalty database, a database relating to a casino management system, etc.), to obtain information for making some determinations related to bonusing functions, e.g., regarding when a player may be invited to join a bonus session. Such a database may reside on one or more of storage devices 1311 (or elsewhere). In some implementations of the invention, a server configured as a bonus controller also provides bonus games, such as Bingo bonus games. Alternatively, another device may provide bonus games, e.g., at times determined by a bonus controller.

License Manager 1331 may also be implemented, at least in part, via a server or a similar device. Some exemplary operations of License Manager 1331 are described in detail in U.S. patent application Ser. No. 11/225,408, entitled "METHODS AND DEVICES FOR AUTHENTICATION AND LICENSING IN A GAMING NETWORK" by Kinsley et al., which is hereby incorporated by reference.

Some preferred embodiments of sb™ server S30 and the other servers shown in FIG. 13 include (or are at least in communication with) clustered CPUs, redundant storage devices, including backup storage devices, switches, etc. Such storage devices may include a "RAID" (originally redundant array of inexpensive disks, now also known as redundant array of independent disks) array, back-up hard drives and/or tape drives, etc.

In some implementations of the invention, many of these devices (including but not limited to License Manager 1331, servers 1332, 1334, 1336 and 1338, and main network device 1325) are mounted in a single rack with sb™ server 1330. Accordingly, many or all such devices will sometimes be referenced in the aggregate as an "sb™ server." However, in alternative implementations, one or more of these devices is in communication with sb™ server 1330 and/or other devices of the network but located elsewhere. For example, some of the devices could be mounted in separate racks within computer room 1320 or located elsewhere on the network. Moreover, it can be advantageous to store large volumes of data elsewhere via a storage area network ("SAN").

Computer room 1320 may include one or more operator consoles or other host devices that are configured for communication with other devices within and outside of computer room 1320. Such host devices may be provided with software, hardware and/or firmware for implementing various aspects of the invention. However, such host devices need not be located within computer room 1320. Wired host device 1360 (which is a laptop computer in this example) and wireless device 1370 (which is a PDA in this example) may be located elsewhere in gaming establishment 1305 or at a remote location. Here, wireless device 1370 is configured for network management tasks, but wireless devices 1370 may also be configured as mobile gaming devices, e.g., for presenting base games and/or bonus games according to the present invention.

Arbiter 133 may be implemented, for example, via software that is running on a server or another networked device. Arbiter 133 serves as an intermediary between different devices on the network. Some implementations of Arbiter 133 are described in U.S. patent application Ser. No. 10/948,387, entitled "METHODS AND APPARATUS FOR NEGOTIATING COMMUNICATIONS WITHIN A GAMING NETWORK" and filed Sep. 23, 2004 (the "Arbiter Application"), which is incorporated herein by reference and for all purposes. In some preferred implementations, Arbiter 133 is a repository for the configuration information required for communication between devices on the gaming network (and, in some implementations, devices outside the gaming network). Although Arbiter 133 can be implemented in various ways, one exemplary implementation is discussed in the following paragraphs.

Figure 14:
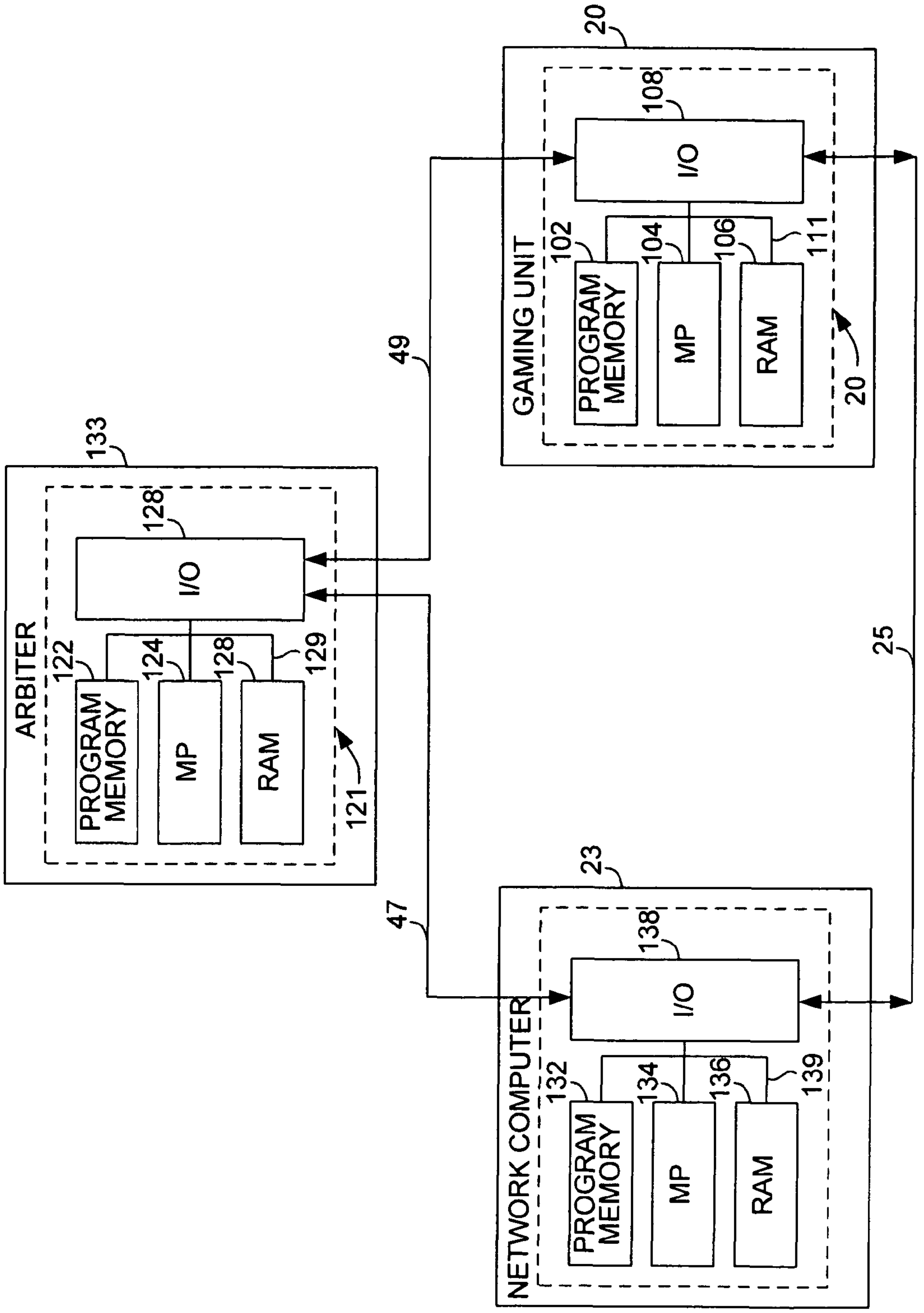
FIG. 14 is a block diagram illustrating the use of an Arbiter in a gaming network.

FIG. 14 is a block diagram of a simplified communication topology between gaming unit 20, network computer 23 and Arbiter 133. Network computer 23 may be, for example, a server or other device within computer room 1320 or elsewhere. Although only one gaming unit 20, one network computer 23 and one Arbiter 133 are shown in FIG. 14, it should be understood that the following examples may be applicable to different types of networked devices in addition to gaming unit 20 and network computer 23, and may include different numbers of network computers, gaming security arbiters and gaming units. For example, a single Arbiter 133 may be used for secure communications among a plurality of network computers 23 and tens, hundreds or thousands of gaming units 20. Likewise, multiple gaming security arbiters 133 may be utilized for improved performance and other scalability factors.

Referring to FIG. 14, the Arbiter 133 may include an arbiter controller 121 that may comprise a program memory 122, a microcontroller or microprocessor (MP) 124, a random-access memory (RAM) 126 and an input/output (I/O) circuit 128, all of which may be interconnected via an address/data bus 129. The network computer 23 may also include a controller 131 that may comprise a program memory 132, a microcontroller or microprocessor (MP) 134, a random-access memory (RAM) 136 and an input/output (I/O) circuit 138, all of which may be interconnected via an address/data bus 139. It should be appreciated that although the Arbiter 133 and the network computer 23 are each shown with only one microprocessor 124, 134, the controllers 121, 131 may each include multiple microprocessors 124, 134. Similarly, the memory of the controllers 121, 131 may include multiple RAMs 126, 136 and multiple program memories 122, 132. Although the I/O circuits 128, 138 are each shown as a single block, it should be appreciated that the I/O circuits 128, 138 may include a number of different types of I/O circuits. The RAMs 124, 134 and program memories 122, 132 may be implemented as semiconductor memories, magnetically readable memories, and/or optically readable memories, for example.

Although the program memories 122, 132 are shown in FIG. 14 as read-only memories (ROM) 122, 132, the program memories of the controllers 121, 131 may be a read/write or alterable memory, such as a hard disk. In the event a hard disk is used as a program memory, the address/data buses 129, 139 shown schematically in FIG. 14 may each comprise multiple address/data buses, which may be of different types, and there may be an I/O circuit disposed between the address/data buses.

As shown in FIG. 14, the gaming unit 20 may be operatively coupled to the network computer 23 via the data link 25. The gaming unit 20 may also be operatively coupled to the Arbiter 133 via the data link 49, and the network computer 23 may likewise be operatively coupled to the Arbiter 133 via the data link 47. Communications between the gaming unit 20 and the network computer 23 may involve different information types of varying levels of sensitivity resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings, etc.), download information (e.g., game and/or peripheral software, licensing information, etc.) and personal information (e.g., social security number, personal preferences, etc.) may be encrypted with stronger encryption techniques such as DES or 3DES to provide increased security.

As disclosed in further detail in the Arbiter Application, the Arbiter 133 may verify the authenticity of each network gaming device. The Arbiter 133 may receive a request for a communication session from a network device. For ease of explanation, the requesting network device may be referred to as the client, and the requested network device may be referred to as the host. The client may be any device on the network and the request may be for a communication session with any other network device. The client may specify the host, or the gaming security arbiter may select the host based on the request and based on information about the client and potential hosts. The Arbiter 133 may provide encryption keys (session keys) for the communication session to the client via the secure communication channel. Either the host and/or the session key may be provided in response to the request, or may have been previously provided. The client may contact the host to initiate the communication session. The host may then contact the Arbiter 133 to determine the authenticity of the client. The Arbiter 133 may provide affirmation (or lack thereof) of the authenticity of the client to the host and provide a corresponding session key, in response to which the network devices may initiate the communication session directly with each other using the session keys to encrypt and decrypt messages.

Alternatively, upon receiving a request for a communication session, the Arbiter 133 may contact the host regarding the request and provide corresponding session keys to both the client and the host. The Arbiter 133 may then initiate either the client or the host to begin their communication session. In turn, the client and host may begin the communication session directly with each other using the session keys to encrypt and decrypt messages. An additional explanation of the communication request, communication response and key distribution is provided in the Arbiter Application.

If a host device is located in a remote location, security methods and devices (such as firewalls, authentication and/or encryption) should be deployed in order to prevent the unauthorized access of the gaming network. Similarly, any other connection between gaming network 1305 and the outside world should only be made with trusted devices via a secure link, e.g., via a virtual private network ("VPN") tunnel. For example, the illustrated connection between sb™ server 1330, gateway 1350 and central system 1363 (that may be used for communications involving peripheral device software downloads, etc.) is advantageously made via a VPN tunnel. Details of VPN methods that may be used with the present invention are described in the reference, "Virtual Private Networks-Technologies and Solutions," by R. Yueh and T. Strayer, Addison-Wesley, 2001, ISBN#0-201-70209-6, which is incorporated herein by reference and for all purposes. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols, including RFC reports, may be obtained from the VPN Consortium, an industry trade group (http://www.vpnc.com, VPNC, Santa Cruz, Calif.).

For security purposes, any information transmitted to or from a gaming establishment over a public network may be encrypted. In one implementation, the information may be symmetrically encrypted using a symmetric encryption key, where the symmetric encryption key is asymmetrically encrypted using a private key. The public key may be obtained from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10,000 faster than asymmetric encryption algorithms.

As mentioned elsewhere herein, U.S. patent application Ser. No. 11/225,408, entitled "METHODS AND DEVICES FOR AUTHENTICATION AND LICENSING IN A GAMING NETWORK" by Kinsley et al., describes novel methods and devices for authentication, downloading and license management. This application has been incorporated herein by reference.

Providing a secure connection between the local devices of the gaming network 1305 and central system 1363 allows for the deployment of many advantageous features. For example, a customer (e.g., an employee of a gaming establishment) can log onto an account of central system 1363 to obtain the account information such as the customer's current and prior account status. Automatic updates of a customer's software may also be enabled. For example, central system 1363 may notify one or more devices in gaming establishment 1305 regarding new products and/or product updates. For example, central system 1363 may notify server (or other device) in computer room 1320 regarding new software, software updates, the status of current software licenses, etc. Alternatively, such updates could be automatically provided to a server in computer room 1320 and downloaded to networked gaming machines.

After the local server receives this information, relevant products of interest may be identified (by the server, by another device or by a human being). If an update or a new software product is desired, it can be downloaded from the central system. Similarly, a customer may choose to renew a software license via a secure connection with central system 1363, e.g., in response to a notification that the software license is required.

In addition, providing secure connections between different gaming establishments can enable alternative implementations of the invention. For example, a number of gaming establishments may be owned and/or controlled by the same entity. In such situations, having secure communications between gaming establishments makes it possible for a gaming entity to use one or more servers in a gaming establishment as an interface between central system 1363 and gaming machines in multiple gaming establishments. For example, new or updated peripheral device software may be obtained by a server in one gaming establishment and distributed to gaming machines in that gaming establishment and/or other gaming establishments.

Moreover, providing secure communications between gaming establishments allows for convenient implementation of bonus games involving multiple casinos. For example, one or more devices in computer room 1320 may provide bonus games and related services to gaming establishments 1305, 1393 and 1395.

Other Embodiments

Although the foregoing invention has been described in some detail for purposes of clarity of understanding, it will be apparent that certain changes and modifications may be practiced within the scope of the appended claims. For instance, a bonus game of the invention may also be awarded in conjunction with other types of bonuses, including but not limited to Xtra Credit®, Return Play®, Lucky Coin®, Lucky Time®, Personal Progressive®, Regular Progressive, Mystery Bonus®, Celebration Prizes®, etc.

We claim:

1. A gaming method, comprising:

providing a Class III wagering game for play for which there is an established plurality of ranks of players of the Class III wagering game and an established correspondence between each rank and a respective level of bonus Bingo games;

identifying prior to commencement of play by a player a set of players for each respective rank who will receive an offer to play the respective corresponding level of bonus Bingo games;

determining whether the player is included in a set of players for an established rank who will receive an offer to play the respective level of bonus Bingo games corresponding to said established rank; and offering the player an opportunity to play the respective corresponding level of bonus Bingo games if it is determined that the player is included in the set of players for said established rank.

2. The gaming method of claim 1, wherein the establishment of the plurality of ranks includes referencing data pertaining to a player loyalty program.

3. The gaming method of claim 1, wherein the establishment of the plurality of ranks includes referencing recent player activity.

4. The gaming method of claim 1, wherein the offering step comprises offering Bingo cards for the bonus Bingo games in response to events pertaining to the Class III wagering game.

5. The gaming method of claim 1, wherein the offering step comprises offering Bingo cards for the bonus Bingo games in exchange for money, player loyalty points or game credits.

6. The gaming method of claim 1, wherein the offering step comprises:

offering, to a first rank of players, an opportunity to play a first level of bonus Bingo games; and offering, to a second rank of players, an opportunity to play a second level of bonus Bingo games.

7. The gaming method of claim 1, wherein the offering step comprises:

offering, to a first rank of players, an opportunity to play a first level of bonus Bingo games at no extra charge; and offering, to a second rank of players, an opportunity to play a second level of bonus Bingo games in exchange for money, player loyalty points or game credits.

8. The gaming method of claim 1, wherein the Class III wagering game comprises a slot game, a poker game, a blackjack game, a keno game or a baccarat game.

9. The gaming method of claim 1 wherein the Class III wagering game is provided for play on a remote game player over a network.

10. The gaming method of claim 1 wherein the levels of bonus Bingo games are provided for play in a gaming establishment.

11. A gaming system, comprising:

means for providing a Class III wagering game;

means for establishing a plurality of ranks of players of the Class III wagering game;

means for making a correspondence between each established rank of players and a respective level of bonus Bingo games;

means for identifying prior to commencement of play by a player a set of players for each rank who will receive an offer to play the respective corresponding level of bonus Bingo games;

means for determining whether the player is included in a set of players for an established rank who will receive an offer to play the respective level of bonus Bingo games corresponding to said established rank; and means for offering the player an opportunity to play the respective corresponding level of bonus Bingo games if it is determined that the player is included in the set of players for said established rank.

12. The gaming system of claim 11, wherein the establishing means comprises means for referencing data pertaining to a player loyalty program.

13. The gaming system of claim 11, wherein the establishing means comprises means for referencing recent player activity.

14. The gaming system of claim 11, wherein the offering means comprises means for offering Bingo cards for the bonus Bingo games in response to events pertaining to the Class III wagering game.

15. The gaming system of claim 11, wherein the offering means comprises means for offering Bingo cards for the bonus Bingo games in exchange for money, player loyalty points or game credits.

16. The gaming system of claim 11, wherein the offering means comprises:

means for offering, to a first rank of players, an opportunity to play a first level of bonus Bingo games; and means for offering, to a second rank of players, an opportunity to play a second level of bonus Bingo games.

17. The gaming system of claim 11, wherein the offering means comprises:

means for offering, to a first rank of players, an opportunity to play a first level of bonus Bingo games at no extra charge; and means for offering, to a second rank of players, an opportunity to play a second level of bonus Bingo games in exchange for money, player loyalty points or game credits.

18. The gaming system of claim 11, wherein the Class III wagering game comprises a slot game, a poker game, a blackjack game, a keno game or a baccarat game.

19. The gaming system of claim 11, wherein the offering means comprises an electronic gaming machine.

20. The gaming system of claim 11, wherein the offering means comprises a kiosk.

21. The gaming system of claim 11, wherein the offering means comprises a server.

22. The gaming system of claim 11 wherein the Class III wagering game is provided for play on a remote game player over a network.

23. The gaming system of claim 11 wherein the levels of bonus Bingo games are provided for play in a gaming establishment.

* * * * *

UNITED STATES PATENT AND TRADEMARK OFFICE

CERTIFICATE OF CORRECTION

PATENT NO. : 8,540,562 B2
APPLICATION NO. : 11/655453
DATED : September 24, 2013
INVENTOR(S) : Roper et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1831 days.

Signed and Sealed this
Third Day of March, 2015

Michelle K. Lee

Michelle K. Lee
*Deputy Director of the United States Patent and Trademark Office*